United States Patent [19]
Bunnell

[11] Patent Number: 6,119,122
[45] Date of Patent: *Sep. 12, 2000

[54] METHOD AND APPARATUS FOR GENERICALLY VIEWING AND EDITING OBJECTS

[75] Inventor: Karl Lee Bunnell, American Fork, Utah

[73] Assignee: Novell, Inc., Provo, Utah

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/932,276

[22] Filed: Sep. 17, 1997

[51] Int. Cl.[7] .................................................. G06F 17/30
[52] U.S. Cl. ........................... 707/102; 707/103; 707/104
[58] Field of Search .................................... 707/102, 103, 707/100, 200, 514, 104, 2–5

[56] References Cited

U.S. PATENT DOCUMENTS

| | | | |
|---|---|---|---|
| 5,206,951 | 4/1993 | Khoyi et al. | 395/650 |
| 5,361,350 | 11/1994 | Conner et al. | . |
| 5,491,821 | 2/1996 | Kilis | 395/700 |
| 5,504,906 | 4/1996 | Lutoff | 395/700 |
| 5,560,014 | 9/1996 | Imamura | 395/700 |
| 5,586,314 | 12/1996 | Hill et al. | . |
| 5,627,979 | 5/1997 | Chang et al. | . |
| 5,677,851 | 10/1997 | Kingdon et al. | 364/514 |
| 5,680,615 | 10/1997 | Marlin et al. | . |
| 5,692,180 | 11/1997 | Lee | 395/610 |
| 5,732,271 | 3/1998 | Berry et al. | 395/683 |
| 5,742,813 | 4/1998 | Kavanagh et al. | 395/608 |
| 5,778,377 | 7/1998 | Marlin et al. | . |
| 5,784,560 | 7/1998 | Kingdon et al. | 395/200.31 |
| 5,819,282 | 10/1998 | Hooper et al. | . |
| 5,838,965 | 11/1998 | Kavanagh et al. | . |
| 5,864,865 | 1/1999 | Lakis | 707/103 |
| 5,983,234 | 11/1999 | Tietjen et al. | 707/103 |

OTHER PUBLICATIONS

Novell's Guide to NetWare 4.1 Networks, Jeffrey Hughes and Blair W. Thomas, ISBN: 1–56884–736–X, Copyright 1996, Table of Contents and Chapter 3.

Internet Webpage description of REGEDIT program by Microsoft, downloaded Feb. 6, 1998.

Habbash et al, "Towards an Efficient Management of Objects in a Distributed Environment", IEEE 1990.

*Primary Examiner*—Thomas G. Black
*Assistant Examiner*—Uyen Le
*Attorney, Agent, or Firm*—Dinsmore & Shohl

[57] ABSTRACT

A method and apparatus is used for generically viewing and editing values and attributes of distributed directory objects. A data structure is adapted to represent one or more attributes and associated values of a target object in a distributed directory. A user interface receives inputs from a human user and displays at least a portion of the data structure, irrespective of the target object type. One or more syntax editors receives inputs from a human user and modify the data structure. Each of the one or more syntax editors correspond to at least one attribute syntax in the distributed directory. A mechanism modifies the target object in the distributed directory to include modifications made to the data structure with the attribute editors.

10 Claims, 26 Drawing Sheets

| OCTET STRING (MULTI-VALUED, NOT SIZED) | | | | | | | | | | | | | | | | |
|---|---|---|---|---|---|---|---|---|---|---|---|---|---|---|---|---|
| 00000000 | 00 | 01 | 02 | 03 | 04 | 05 | 06 | 07 | 08 | 09 | 0A | 0B | 0C | 0D | 0E | 0F | . . . . . . . . . . . . . . . . |
| 00000010 | 10 | 11 | 12 | 13 | 14 | 15 | 16 | 17 | 18 | 19 | 1A | 1B | 1C | 1D | 1E | 1F | . . . . . . . . . . . . . . . . |
| 00000020 | 20 | 21 | 22 | 23 | 24 | 25 | 26 | 27 | 28 | 29 | 2A | 2B | 2C | 2D | 2E | 2F | !*#$%&'()*+,-./ |
| 00000030 | 30 | 31 | 32 | 33 | 34 | 35 | 36 | 37 | 38 | 39 | 3A | 3B | 3C | 3D | 3E | 3F | 0123456789:;<=>? |
| 00000040 | 40 | 41 | 42 | 43 | 44 | 45 | 46 | 47 | 48 | 49 | 4A | 4B | 4C | 4D | 4E | 4F | @ABCDEFGHIJKLMNO |
| 00000050 | 50 | 51 | 52 | 53 | 54 | 55 | 56 | 57 | 58 | 59 | 5A | 5B | 5C | 5D | 5E | 5F | PQRSTUVWXYZ[\]^_ |
| 00000060 | 60 | 61 | 62 | 63 | 64 | 65 | 66 | 67 | 68 | 69 | 6A | 6B | 6C | 6D | 6E | 6F | `abcdefghijklmno |
| 00000070 | 70 | 71 | 72 | 73 | 74 | 75 | 76 | 77 | 78 | 79 | 7A | 7B | 7C | 7D | 7E | 7F | pqrstuvwxyz{|}~. |
| 00000080 | 80 | 81 | 82 | 83 | 84 | 85 | 86 | 87 | 88 | 89 | 8A | 8B | 8C | 8D | 8E | 8F | . . . . . . . . . . . . . . . . |
| 00000090 | 90 | 91 | 92 | 93 | 94 | 95 | 96 | 97 | 98 | 99 | 9A | 9B | 9C | 9D | 9E | 9F | . . . . . . . . . . . . . . . . |

DATA SIZE: 255    OFFSET DEC: 0    OFFSET HEX: 0    MODE: INSERT

[OK]  [CANCEL]  [HELP]  [PROPERTIES...]

FIG. 9

ADD VALUE, CASE 5

DELETE VALUE, CASE 3

BEFORE:  LIVE  DELETE

N/A

AFTER:  LIVE  DELETE

MODIFY VALUE, CASE 5

METHOD AND APPARATUS FOR GENERICALLY VIEWING AND EDITING OBJECTS

COPYRIGHTS PRESERVED

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates generally to viewing and managing a distributed directory, and will be specifically disclosed as a method and apparatus for generically viewing and editing objects in a distributed directory.

BACKGROUND OF THE INVENTION

The virtual explosion of technical advances in microelectronics, digital computers and software have changed the face of modem society. In fact, these technological advances have become so important and pervasive that this explosion is sometimes referred to as "the information revolution." Through telephone lines, networks, satellite communications and the like, information and resources are ever increasingly being accessed and shared.

When a group of computers are connected to one another, such as in a client/server network, a management service is typically used to organize and administer information and resources across the network. Management services usually access or include a database having a collection of objects that represent a variety of things. For instance, some typical objects represent users, groups, printers, computers, and the like. Objects in a management service are often organized in flat domains such as the SECURITY ACCOUNTS MANAGER ("SAM") of WINDOWS NT, in a distributed directory such as NOVELL DIRECTORY SERVICES ("NDS"), or in other ways known in the art. Each management service object has at least one associated attribute with one or more associated values. Generally, each attribute has an attribute syntax such that the value associated with the attribute is of a data type corresponding to the attribute syntax. For example, integer values are associated with integer attributes.

Typically, each object is of a particular type and is created from a corresponding class. For example, a User object would be created from a User class, a Printer object would be created from a Printer class, etc. The object classes provide a kind of template to define the various attributes that will be associated with the objects. Building on the prior example, an object created from the User class could have the following attributes: Given Name, Last Name, Title, Telephone Number, etc. When an object is created from a class, values are filled into the various attributes of the class, thereby creating an instance of the class. For example, a User object could have the value "Joyce" associated with the attribute Given Name.

Management service objects are typically viewed and edited with a specially designed program, such as an administrator or manager. Usually, but not always, objects are displayed in a graphical user interface showing the relationship of the various objects. Upon the selection of a given object, coupled with an appropriate command, a detailed user interface or detailed page is typically provided specific to the class from which the object was created. The detailed page usually displays in a specially formatted window several, but not necessarily all, of the attributes in the class and the associated values of the object. In other words, the detailed page used for reading and editing values associated with object attributes is often dependent upon and tailored to the object class.

Detailed pages tailored to object classes work well for predefined or factory provided object classes. However, object classes are usually extensible. In other words, new custom classes can be created, or existing object classes can be modified, to include customized combinations of attributes. To view or edit objects created from newly created classes, a new customized detailed page must be developed, such as through the implementation of a snap-in module. Likewise, to view and edit objects created from modified classes, the existing detailed page must be modified. For instance, one could add an attribute called Social Security Number to the User class. To read and edit values to this new attribute, the detailed page for User objects would need to be modified to include a field for the Social Security Number attribute. Whether creating or modifying a detailed page, someone is typically required to develop a customized user interface, which often involves the expenditure of development time and programming expertise.

Therefore, there is a need for a viewer and attribute editor for management service objects, which provides a means for displaying and editing values associated with object attributes independent of the class from which the object was created, without having to develop a customized user interface.

SUMMARY OF THE INVENTION

Accordingly, an object of the invention is to provide a method and apparatus for generically viewing and editing of objects.

A further object of the invention is to provide an improved user interface for viewing and editing objects.

Still another object of the invention is to provide an improved data structure for representing objects.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a computer system. A management service has a plurality of objects of different types. Each of the objects have at least one associated attribute with an attribute syntax. A plurality of the attributes have an associated value being of a data type corresponding to the attribute syntax of the associated attribute. A data structure capable of being modified is adapted to represent one or more attributes and associated values of a target object. A user interface is adapted to receive inputs from a human user and to display at least a portion of the data structure irrespective of the target object type. One or more syntax editors are adapted to receive inputs from a human user to modify the data structure. Each of the one or more syntax editors correspond to at least one attribute syntax. A mechanism modifies the target object to include modifications made to the data structure.

Another aspect of the present invention is a method in a computer system. A distributed directory is accessed having a plurality of objects each created from a class. Each of the objects have at least one associated attribute with an attribute syntax. A plurality of the attributes have an associated value. A target object in the distributed directory is selected. One or more of the attributes for the target object is generically displayed, independent of the attributes in the class from which the target object was created. An editor corresponding to the syntax of a target attribute of the target object is provided. The editor is adapted to modify the values associated with the target attribute. The editor receives inputs for modifying the values associated with the target attribute. The distributed directory is modified to include one or more of the modifications to the values received by the editor.

Yet another aspect of the present invention is an object oriented class structure for representing in a computer system one or more distributed directory objects. Each of the one or more distributed directory objects have at least one associated attribute with an attribute syntax and an associated value. A value class has a plurality of data members and a plurality of method members and is capable of being instantiated into objects for representing values associated with attributes of distributed directory objects. A plurality of derived classes inherit members from the value class. Each of the derived classes correspond to at least one attribute syntax, have a plurality of data members and a plurality method members, and are capable of being instantiated into objects. An attribute class has a plurality data members and a plurality of method members, and is capable of being instantiated into objects for representing attributes of distributed directory objects and for managing objects instantiated from the value class. The value class objects represent values associated with the attributes represented by the attribute class objects.

Still another aspect of the present invention is a user interface for representing in a computer system at least a portion of a distributed directory. The distributed directory has a hierarchy of objects, each of the objects having at least one attribute with an associated value. A set of object representations are displayed in a relationship to one another for representing the hierarchy of objects for at least a portion of the distributed directory. Each object representation corresponds to one or more objects in the distributed directory. A plurality of attribute representations are displayed in a tree structure. Each of the attribute representations correspond to one or more attributes of the distributed directory object corresponding to an object representation. One or more value representations are displayed relative to an attribute representation. The value representations correspond to the associated values of the attribute corresponding to the attribute representation.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings:

FIG. 9 depicts an editor for viewing and modifying a hex value;

Reference will now be made to the present preferred embodiment of the invention, an example of which is illustrated in the accompanying drawings, wherein like numerals indicate the same element throughout the views.

DETAILED DESCRIPTION

Often computers telecommunicate between each other and share information, applications and/or services. Sometimes in this setting, the various computers are referred to as nodes, which is a generic term referring to a point in a interconnected system. One type of computer network employs a client/server architecture, wherein the portions of network applications that interact with human users are typically separated from the portions of network applications that process requests and information. Often, the portions of an application that interact with users or access network resources are called client applications or client software, and the portions of an application that process requests and information are called server applications or server software. Client machines tend to run client software and server machines tend to run server software, however a server can be a client as well.

Figure 1:
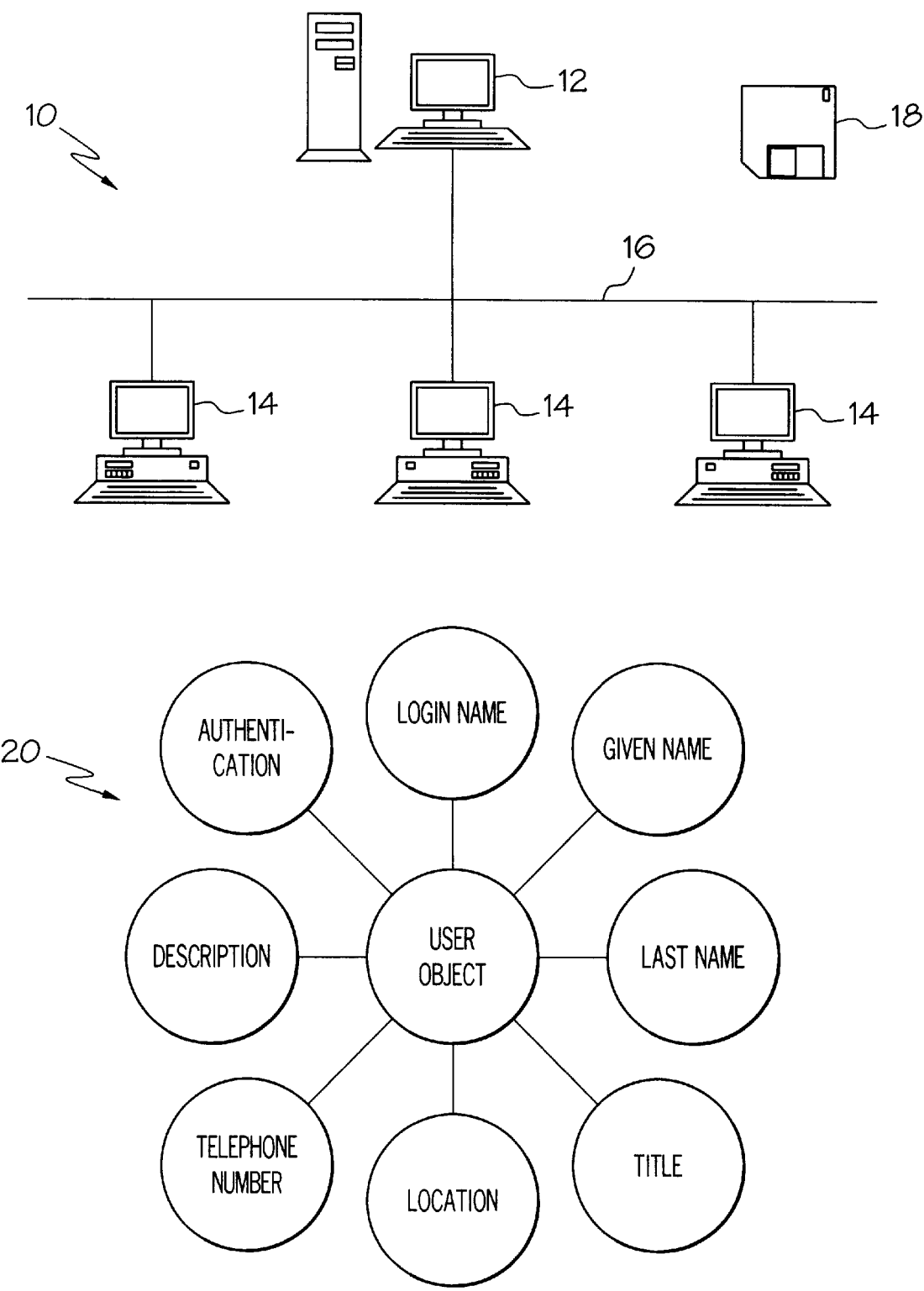
FIG. 1 depicts an example of interconnected nodes, a computer readable medium, and a distributed directory object with several associated attributes.

FIG. 1 illustrates a sample client/server network 10. As one with ordinary skill in the art will readily appreciate, a client/server network is only one type of network, and a variety of other configurations, such as peer-to-peer connections, are also considered computer networks. In a client/server network, a plurality of nodes are interconnected such that the various nodes send and/or receive information to/from one another. As shown here, a server node 12 is interconnected to a plurality of client nodes 14 using a connection 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable medium can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Some types of computer readable medium, which are sometimes described as being nonvolatile, can retain data in the absence of power so that the information is available when power is restored.

One mechanism to maintain and access information across a network of interconnected nodes is a synchronized hierarchical database called a distributed directory, which is only one type of management service. One example of a distributed directory is the NOVELL DIRECTORY SERVICES ("NDS"), which is based on the X.500 network services protocol developed and published by the CCITT and Open Systems Interconnection Consortium. A distributed directory is a database in the sense that information is stored as opposed to the traditional definition under Codd and Date (e.g. ISBN 0-201-51381-1). Usually in the context of a client/server network, a distributed directory spans and is shared by multiple networking server nodes, although a single server node can also maintain a distributed directory. While distributed directories are often used with client/server networks, they are not necessarily limited to the context of such networks. Information on the distributed directory can be created, read, modified, and shared by other nodes, such as client nodes or other server nodes, who have applicable access rights to the distributed directory.

A management service contains a collection of objects, sometimes referred to as identities, with associated attributes or properties. For example, the object 20 is a User object that represents a human user. Beyond representing users, objects represent things that humans relate to when dealing with computers. For instance, some typical objects might represent printers, print queues, files, resources, computers, and the like. In addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real.

The object 20 has a variety of associated attributes, such as "Given Name", "Last Name", "Title", etc. Each associated attribute has a value, however, sometimes values are not associated with an attribute. For example, the value for the property "Given Name" might be "George". An attribute is usually based on an attribute type, which has an attribute syntax. The data which can be entered as a value associated with the attribute is dictated by the attribute syntax. For instance, NDS version 4.1 includes the following attribute types: Back Link, Boolean, Case Exact String, Case Ignore List, Case Ignore String, Class Name, Counter, Distinguished Name, E-mail Address, Facsimile Telephone Number, Hold, Integer, Interval, Net Address, Numeric String, Object ACL, Octet List, Octet String, Path, Postal Address, Printable String, Replica Pointer, Stream, Telephone Number, Time, Timestamp, Typed Name, and Unknown. Each of these attribute types has a predetermined attribute syntax or data structure appropriate for the type of data that will be entered as a value.

Typically, the structure of the distributed directory is governed by a schema. The schema defines the rules for adding and managing objects and attributes of objects in the distributed directory. These rules are specified through a data dictionary that provides a standard set of data types or classes from which objects can be created. Each object in the distributed directory belongs to an object class that specifies which attributes are associated with the object. Generally, the schema is extensible so that it may be tailored to modify existing classes or add new classes.

The schema controls not only the structure of the individual objects, but also the relationship among the objects in the distributed directory. In controlling this relationship, the schema specifies subordination among object classes. That is, for every object there is a group of object classes from which subordinate objects can be formed. Objects that can contain other objects are called container objects, which are the building blocks of the distributed directory. Objects that cannot contain other objects are known as non-container or leaf objects.

Figure 2:
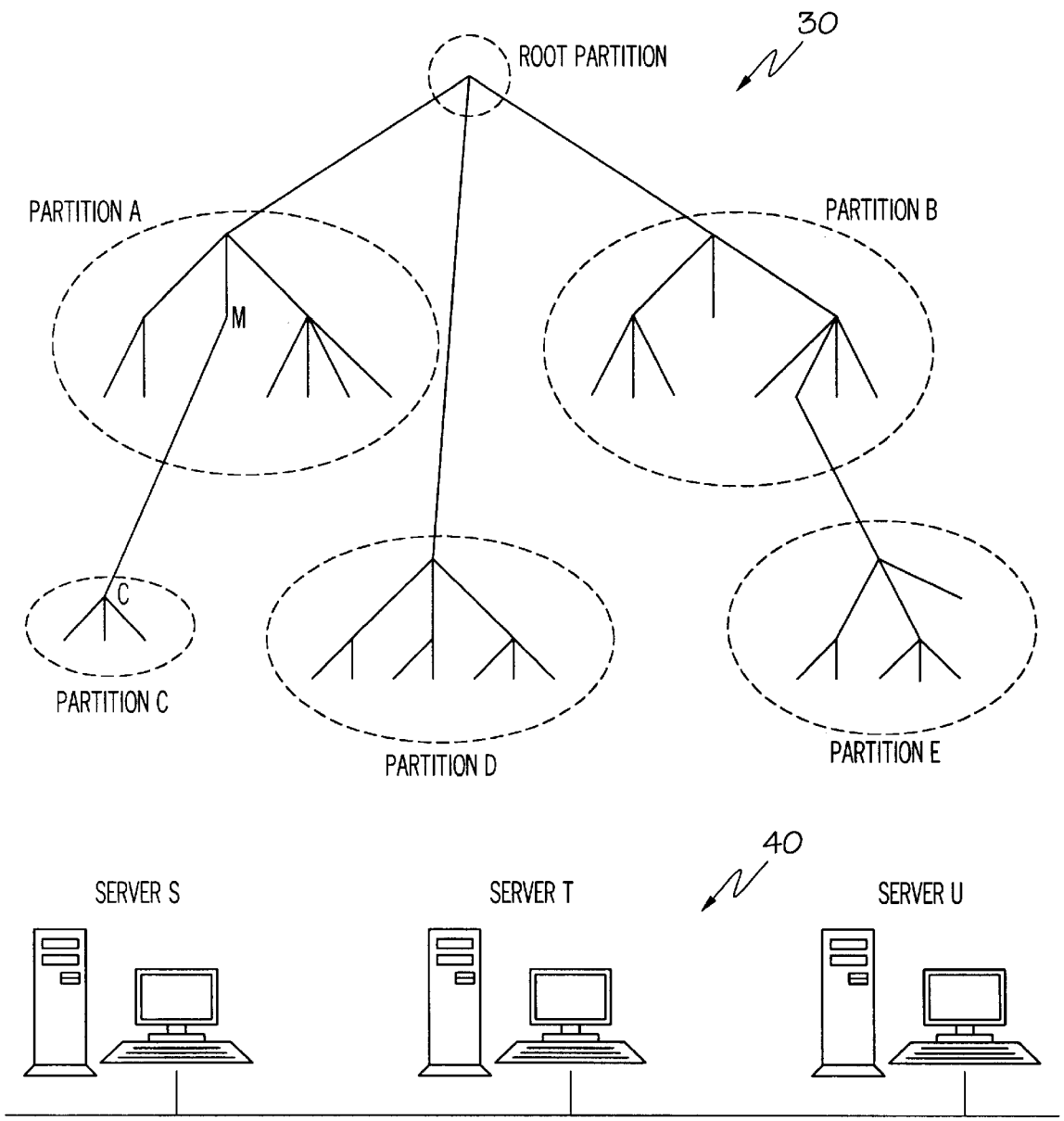
FIG. 2 depicts an example of a distributed directory and several servers accessing the distributed directory.

As shown in FIG. 2, the objects within the distributed directory 30 are often organized in a hierarchical structure, generally in the form of a tree, where the branching points and leaves represent the objects. In this hierarchy, objects closer to the root are superior or parents to objects further from the root, which are considered subordinate or children. For instance, the object M is the parent of the child object C. Object M can also be referred to as the container to object C. The distributed directory 30 is additionally organized in partitions, as illustrated by the dashed ellipses, with each partition comprising a plurality of objects organized as a logical sub-tree. Like objects, partitions closer to the root of the distributed directory 30 are called parent partitions to those further from the root, which are called child partitions. Each partition takes the name of the root object of the sub-tree. For instance, the root object of Partition C is the object C.

Multiple replicas of the partitions are stored across the network 40, wherein each insular server node holds a unique set of partitions and therefore a unique set of objects within that insular node. For instance, the following table demonstrates a sample partition organization in NDS:

|  | Root | Partition A | Partition B | Partition C | Partition D | Partition E |
| --- | --- | --- | --- | --- | --- | --- |
| Server S | Master | — | Master | Master | Read Only | Master |
| Server T | Read Only | Master | Secondary | — | Master | — |
| Server U | — | Read Only | Secondary | — | Read Only | Secondary |

As suggested by this table, there are three basic kinds of replicas in NDS. With a Read Only replica, clients can read entries from this replica, but cannot change entries. Each partition can have zero or more Read Only replicas. With a Secondary replica, clients can read, write, create and destroy entries in the distributed directory by accessing this replica. Each partition has zero or more Secondary replicas. A Master replica acts like a Secondary replica, but clients can additionally make structural changes by accessing the master replica, such as splitting and combining partitions, or creating and removing replicas. Each partition has exactly one Master replica.

In addition to the three types of replicas illustrated in the table, a fourth kind of partition, called subordinate references, are also used to coordinate partitions between a plurality of nodes. A subordinate reference does not store a replica of its partition data. Rather, it is a skeleton: it stores only attributes to the partitions root most object. Whenever a server holds a complete replica (i.e. Master, Secondary or Read Only) of a partition, but not a directly subordinate partition, it keeps a subordinate reference of the subordinate partition. Referring to FIG. 2 and the table, Server T holds a subordinate reference for Partition C (since it keeps a replica of Partition A) and Partition E (since it keeps a replica of Partition B). Server T ends up with a replica of each partition when subordinate references are included. Likewise, Server U holds a subordinate reference for Partition C (since it keeps a replica of Partition A). But Server U does not hold a replica of each partition: the Root Partition is absent. With subordinate references, a server can walk up and down the name tree across partition boundaries.

The distributed directory is a loosely synchronized database. An update made at one replica does not appear instantaneously at the other replicas. As such, it is possible that when an attribute value has been updated recently, a client could get a different result when reading attributes from different servers. A replication system is used to replicate or synchronize different objects changes in the distribute directory throughout the other servers accessing the distributed directory. One way of achieving this replication or synchronization is using the partition as a unit of data replication. An update made at one replica propagates to other replicas over time. Once the update ceases, the replicas converge to identical values. The server keeps a time stamp for each value of each attribute of each entry, identifying when and where that value was last modified. Since there can be competing updates at different replicas, the time stamps are used to determine which update is later. Doing so ensures that whenever multiple servers receive competing updates, each server with get the same result.

When a change is made locally to an entry in the distributed directory, a process in the server wakes up to propagate the change to all the replicas of the partition. Preferably, there is a brief time delay to allow a cluster of updates to be propagated in one session. This propagation proceeds one replica at a time through the replica list of a partition. After a server successfully sends all pending updates to one replica (or if the operation fails), it goes on to the next replica until all replicas have been updated. Replicas not updated in one round of the synchronization process are rescheduled for a later synchronization cycle. Also, obituaries keep track of information pending transmission to other servers. Obituaries are attribute values not visible to clients, but are used in server-server exchanges. Since obituaries are attribute values, they are synchronized using the same mechanism as the updates and are replicated across the distributed directory.

Figure 3:
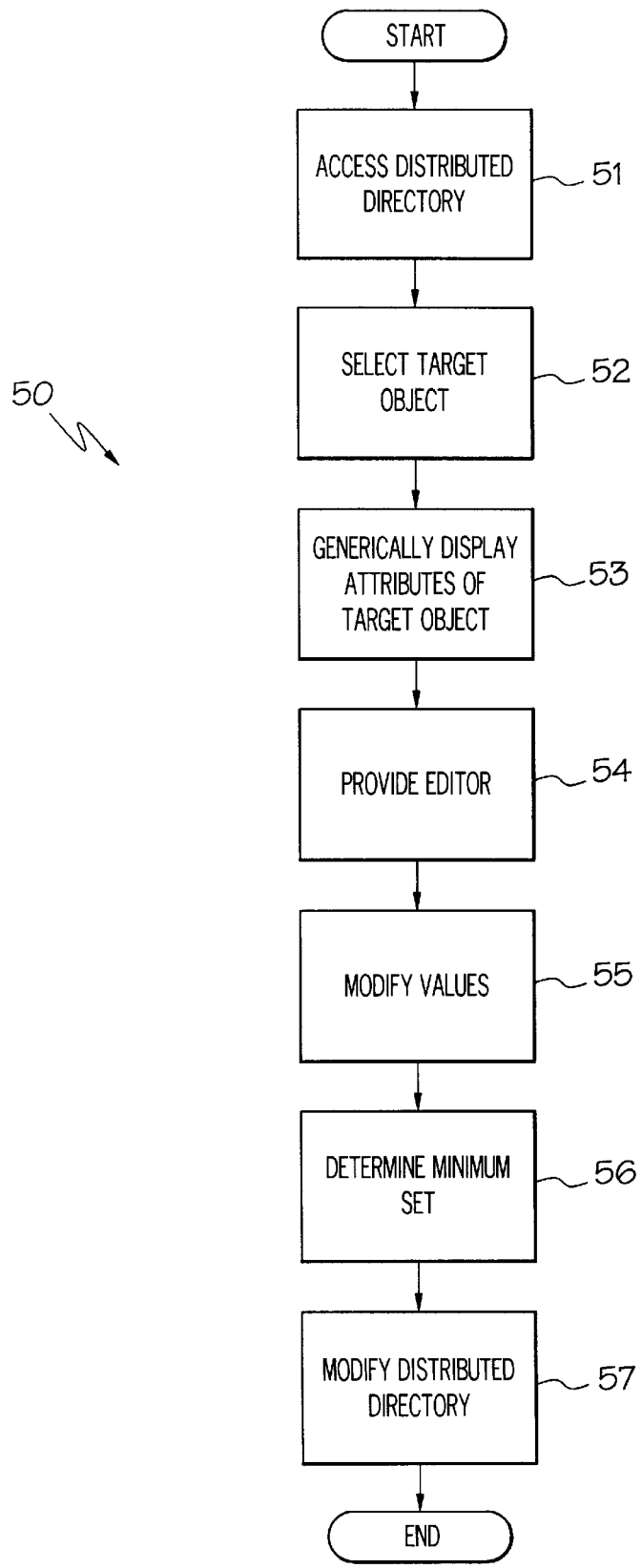
FIG. 3 depicts a method for generically viewing and editing distributed directory objects.

FIG. 3 depicts a method 50 for generically viewing and editing values and attributes of distributed directory objects. The term "generic" or "generically" indicates that a distributed directory object may be viewed and edited substantially independent of the object type or the collection of attributes associated with the class from which the object was created. Therefore, the method 50 may be used to view and edit objects created from any one of a variety of different classes. While a handful of distributed directory classes may be specialized and therefore inapplicable for the method 50, the remainder of the distributed directory classes which can be handled by the method 50 may nevertheless be generically viewed and edited.

At step 51, the distributed directory is accessed. This step can be achieved through a variety of means. For instance, the distributed directory can be accessed through the directory administrator program, such as NWAdmin of NDS. As a further example, function calls using the Lightweight Directory Access Protocol ("LDAP") may be employed, assuming the distributed directory is LDAP compliant. As one with ordinary skill in the art will readily appreciate, the means for accessing the distributed directory will depend upon the specific distributed directory. Preferably, existing access means for the specific distributed directory should be used to achieve step 51, thereby avoiding the development of a specialized access means.

Continuing to step 52, a target object in the distributed directory is selected. For instance, if an administrator program is used, step 52 can be achieved by simply pointing and clicking on the target object within the directory tree displayed in the administrator program. After the target object is selected, the attributes and values of the target object are determined from the distributed directory. In the case of NDS, this can be achieved through the Read operation, which offers considerable flexibility. With the Read operation, one can request attribute names or the attribute names and values together, the latter option being preferred. The Read operation request can indicate specific attributes of interest or can request a complete list of the target objects attributes and values. The suitable operation to determine attributes and values of a target object will vary from one distributed directory to the next. However, a determining means similar to the NDS Read operation is preferred.

In step 53, one or more of the attributes are generically displayed. Preferably, this step 53 involves presenting a list of one or more attributes of the target object. The list of one or more attributes could take a variety of orders, such as alphabetical, order of importance, or some other predetermined or customized sequence. In one embodiment, step 53 is achieved with a list panel in which one or more attributes are displayed. Alternatively, a branch subordinate to the target object in the administrator program lists one or more attributes, thus presenting the hierarchical relationship of the attributes relative to the distributed directory tree. In still another embodiment, a tree structure of attributes and associated values are presented separate from (e.g., in a dialog box or separate space) the representation of the distributed directory objects in the administrator program.

Step 53 can be used in cooperation with detailed pages tailored to specific object classes. For instance, if the target object has a detailed page available, the user may choose between viewing and editing the target object with the detailed page or with a generic user interface. Such a choice can be made using a toggled option through a radio button, check box or a menu selection. Preferably, the generic user interface would be the default selection should no detailed page exist. In one preferred embodiment, associated values are displayed in relation to the corresponding attribute. The value could be displayed adjacent to the attribute, subordinate to the attribute, or in an entirely separate space but nevertheless in conjunction with a selected attribute.

Continuing to step 54, an editor corresponding to the syntax of a target attribute of the target object is provided.

The editor is adapted to receive inputs from a human user, such as through a separate window, dialog box, and the like. Preferably, the editor will be provided upon the selection of the target attribute coupled with an appropriate command. The target attribute can be selected in a number of different ways, such as by directly selecting the target attribute or selecting a value associated with the target attribute. Examples of suitable commands include a double click with a pointer device, a keyboard entry, a menu selection, a button depression, or the like. In an alternative or complimentary embodiment, should the value be displayed along with the attribute, upon the selection of the value an appropriate editable field in the form as an in-line editor is provided in the same location as the value. As one with ordinary skill in the art will readily appreciate, an embodiment using in-line editors is only suitable for certain attribute syntaxes that lend themselves to editable fields.

During step 55, the editor receives inputs for modifying values associated with the target attribute. Appropriate inputs can take a variety of forms, such as mouse selections, button depressions, menu items, keyboard entries, and the like. The step of modifying the values 55 preferably includes changing, deleting or adding values. Any of these variations of modifying the values can be implemented with separate commands.

Optional step 56 involves determining the minimum set of modifications to the target object. This involves manipulating the modifications to reduce the number of changes to be made to the target object in the distributed directory. As the values of the target object are modified, duplicative or reverse modifications may occur. Determining the minimum set prior to translating the modifications to the distributed directory increases network efficiency by avoiding the propagation of unnecessary changes. This advantage is particularly desirable with objects having many attributes. A more detailed description of methods and systems for determining the minimum set are described in greater detail below.

At step 57, the distributed directory is modified to include one or more of the modifications to the values received by the editor. Preferably, step 57 is achieved by writing the modified values in the distributed directory, which are then propagated by the replication system in the distributed directory. In NDS, the preferred mechanism to implement this step 57 is the NDS operation Modify Entry, which is designed to alter attribute values of NDS objects. Modify Entry permits a variety of different types of changes to a target object, including adding a new attribute, removing an attribute, adding values, removing values, adding additional values, over-writing values, clearing all values associated with an attribute, or clearing specified values from an attribute. As are with ordinary skill in the art will readily appreciate, the specific operation for modifying the distributed directory in step 57 will depend upon the distributed directory being modified.

Figure 4:
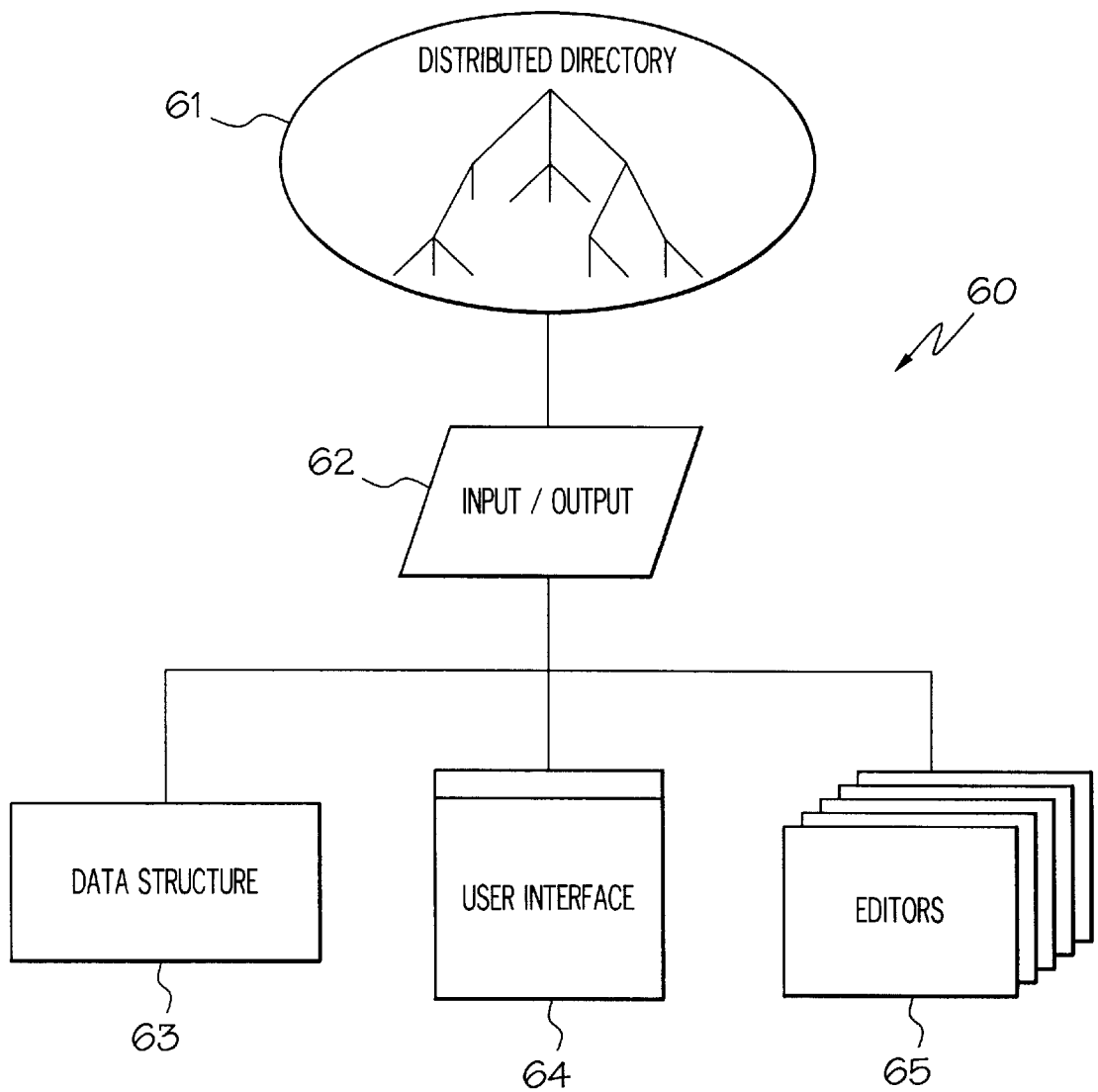
FIG. 4 depicts an apparatus for generically viewing and editing distributed directory objects.

FIG. 4 depicts a schematic system 60 for generically viewing and editing distributed directory objects. The system 60 can be implemented on a computer or a node, and is preferably maintained on a computer-readable medium. The distributed directory 61 interfaces with the input/output mechanism 62, which is capable of both accessing the distributed directory 61, as well as modifying information in the distributed directory 61. Examples of suitable input/output mechanisms 62 would be the Read and Modify Entry operations in NDS. As a further example, standard LDAP function calls are also suitable. As one with ordinary skill in the art will readily appreciate, an appropriate input/output mechanism 62 will depend upon the specific distributed directory 61. Preferably, the input/output mechanism 62 will implement the standard means for interfacing the distributed directory 61.

The data structure 63 is adapted to represent a target object in the distributed directory 61 and is capable of being modified. Through the input/output mechanism 62, information on one or more of the attributes and associated values of the target object are transferred to the data structure 63. Such information includes data on the object, its attributes, and its values. The data structure 63 can take a variety of forms, such as a series of variables, an array, an object-oriented class structure, data members in the classes of the user interface 64 (e.g., stored in the list control or edit control objects in the MICROSOFT FOUNDATION CLASS LIBRARY), a database and the like.

The user interface 64 is adapted to display at least a portion of the data structure 63 irrespective of the target object type. Preferably, such a display will represent the objects and attributes of the distributed directory. Upon the selection of an attribute, an appropriate editor 65 appears. The one or more syntax editors 65 are adapted to receive input from a human user to modify the data structure 63. Each of the one or more syntax editors 65 correspond to at least one attribute syntax in the distributed directory 61. For instance, one syntax editor could modify string values. Another syntax editor could modify numeric values. And still another syntax editor could modify hex values. A given syntax editor can also correspond to multiple syntaxes. For instance, a numeric editor could be used to edit integer values, telephone number values, time values, and the like. Preferably, such an editor will provide appropriate spacing and characters in its edit field to accommodate the various value types.

Figure 5:
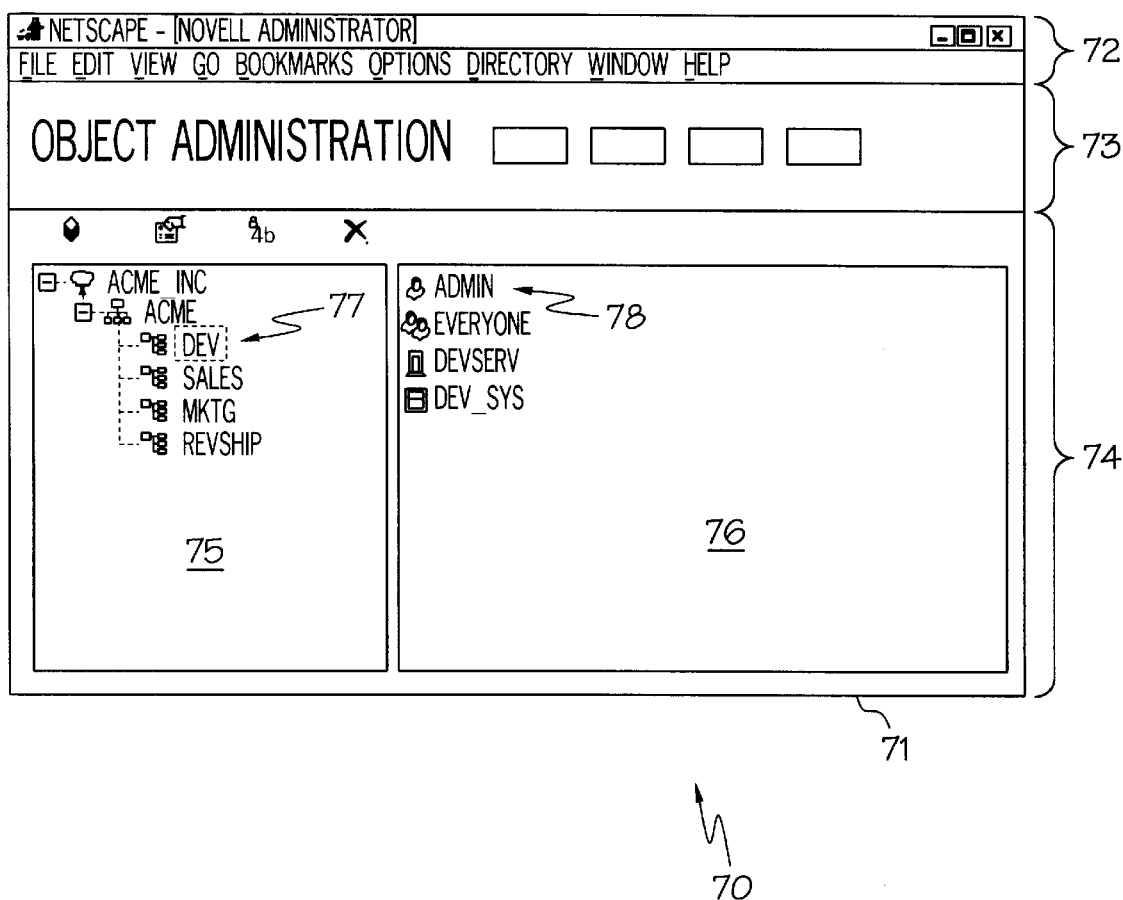
FIG. 5 depicts a user interface for representing at least a portion of a distributed directory.

An example of a suitable user interface 64 is depicted in FIG. 5. The user interface 70 represents in a computer system at least a portion of a distributed directory. The user interface 70 is bound in a display area 71, which preferably comprises a window type graphical user interface on a display screen of a computer system. The header area 72 includes a title bar and a series of drop down menu commands, which may be implemented through a selection mechanism such as a pointing device (e.g., mouse, trackball, pen, etc.), keyboard commands, and other such selection mechanisms known in the art.

In one preferred embodiment, the user interface 70 is presented as an applet, preferably developed in a language such as JAVA or ACTIVEX, within a HTML document and displayed with an HTML browser. HTML, or HyperText Markup Language, is the markup language with which world wide web HyperText documents are written. In such an embodiment, the header area 72 is controlled by the HTML browser. The user interface 70 optionally includes a title/navigation bar 73 which provides access to the individual applet views 74. Title navigation bar 73 also identifies the active applet 74 and provides feedback to the user that there is system activity, such as through an animated icon.

The user interface 70 includes two panes, 75, 76, for representing a portion of the distributed directory. Each of the panes 75, 76 include a set of object representations. Each of the object representations correspond to one or more objects in the distributed directory. For instance, the object representation 77 includes an iconic and a textual representation corresponding to the container object "Dev" in the distributed directory. Similarly, the object representation 78 includes an iconic and textual representation corresponding to the leaf object "Admin" in the distributed directory.

In this embodiment, the two panes 75, 76 work in cooperation to represent the hierarchy of objects for at least a portion of the distributed directory by displaying the object representations in relationship to one another. Specifically, the left pane 75 displays a relationship among the object representations as a tree structure to represent a portion of the distributed directory. On the other hand, the right pane 76 includes object representations corresponding to objects subordinate to a selected object representation in the left pane 75. In this example, the object representations in the right pane 76 correspond to leaf objects subordinate to the selected container object representation 77. In another variation, the right pane 76 includes representations for all first generation child objects, including leaf and container objects. The object representations may also be displayed in a variety of other relationships for representing the hierarchy of objects in the distributed directory. For example, leaf objects can be displayed as a subordinate branch to a selected container object representation in the same tree structure. In another embodiment, each level of object representation could be displayed in a separate pane, thereby not employing a tree structure for representing the distributed directory.

Figure 6:
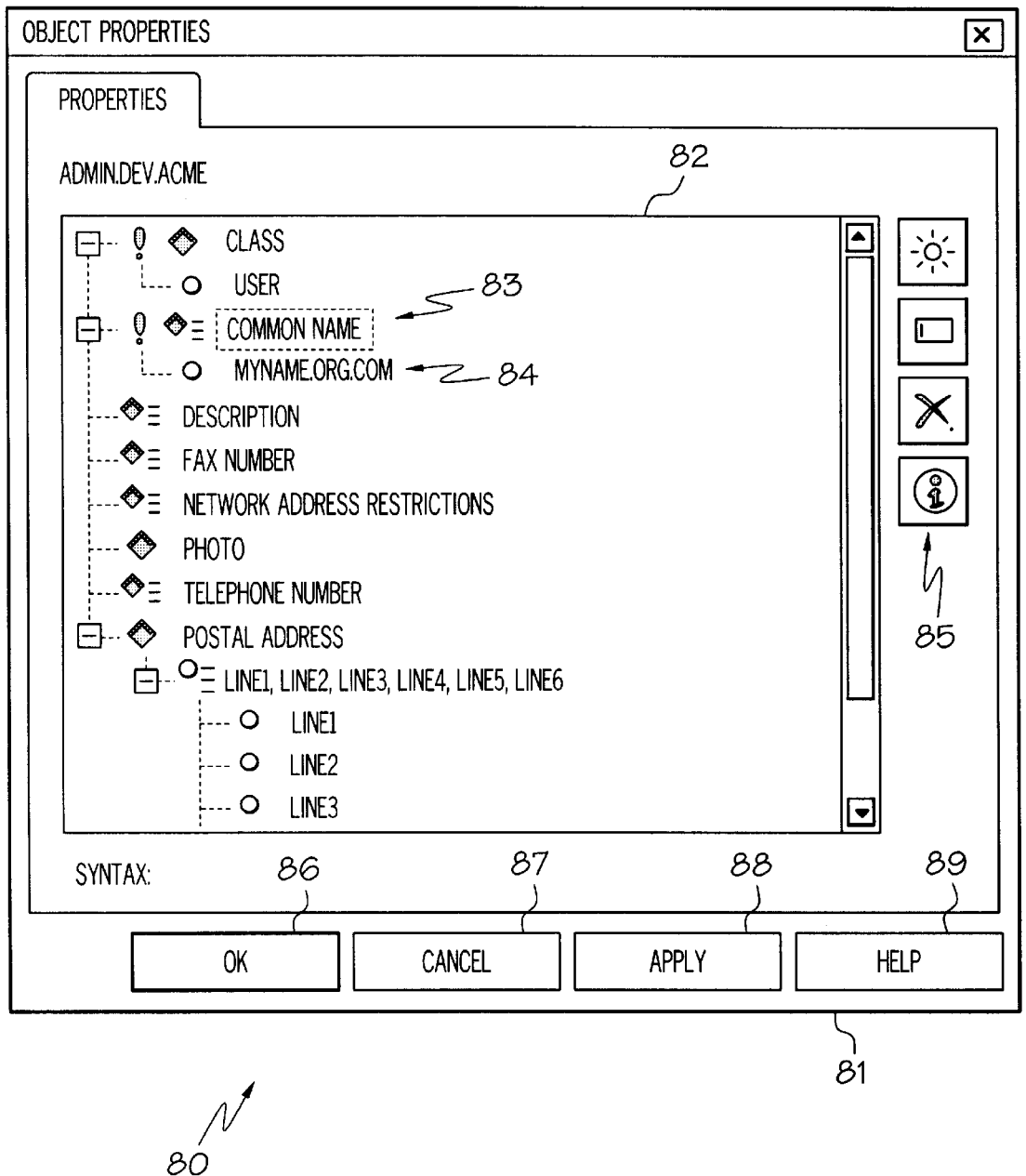
FIG. 6 depicts an extension of the user interface of FIG. 5, wherein a plurality of attribute representations are displayed separate from the corresponding object representation.

FIG. 6 depicts a user interface 80 for representing in a computer system at least a portion of the distributed directory. This user interface 80 is an extension of the user interface 70 and corresponds to the target object representation 78. The user interface 80 is bound in its own display area 81, such as a window or dialog box separate from the user interface 70. Preferably, the user interface 80 is presented after an object representation in the display area 71 is selected coupled with an appropriate command (e.g., double click of a mouse button).

Within the display area 81 is a scrollable pane 82 which includes a plurality of attribute representations listed in a tree structure. Each of the attribute representations correspond to one or more attributes of the object corresponding to the target object representation 78. For instance, the attribute representation 83 includes an iconic and a textual representation of the attribute Common Name, which attribute is associated with the distributed directory object having the distinguished name Admin.Dev.Acme.

One or more value representations are displayed relative to the attribute representations, preferably in the same display area 81. The value representations correspond to associated values in the distributed directory. In this example, the value representation includes an iconic and a textual representation of the value MyName.org.com, which value is associated with the distributed directory attribute Common Name. Preferably, as displayed in FIG. 6, the value representations are displayed as a branch subordinate to the corresponding attribute representation. In such an embodiment, the branch can be expanded or collapsed based on appropriate commands, such as double clicking a mouse button on an attribute representation. In an alternative embodiment, value representations are displayed in a separate pane or dialog box upon the selection of a target attribute, whereas the values will correspond to that attribute. In yet another embodiment, upon the selection of an attribute representation, the value representation will be presented within an editor corresponding to the syntax of the attribute. In still another embodiment, the tree structure of the attribute representations is displayed as a sub-tree within the object representation tree, directly branching from the target object representation.

Figure 7:
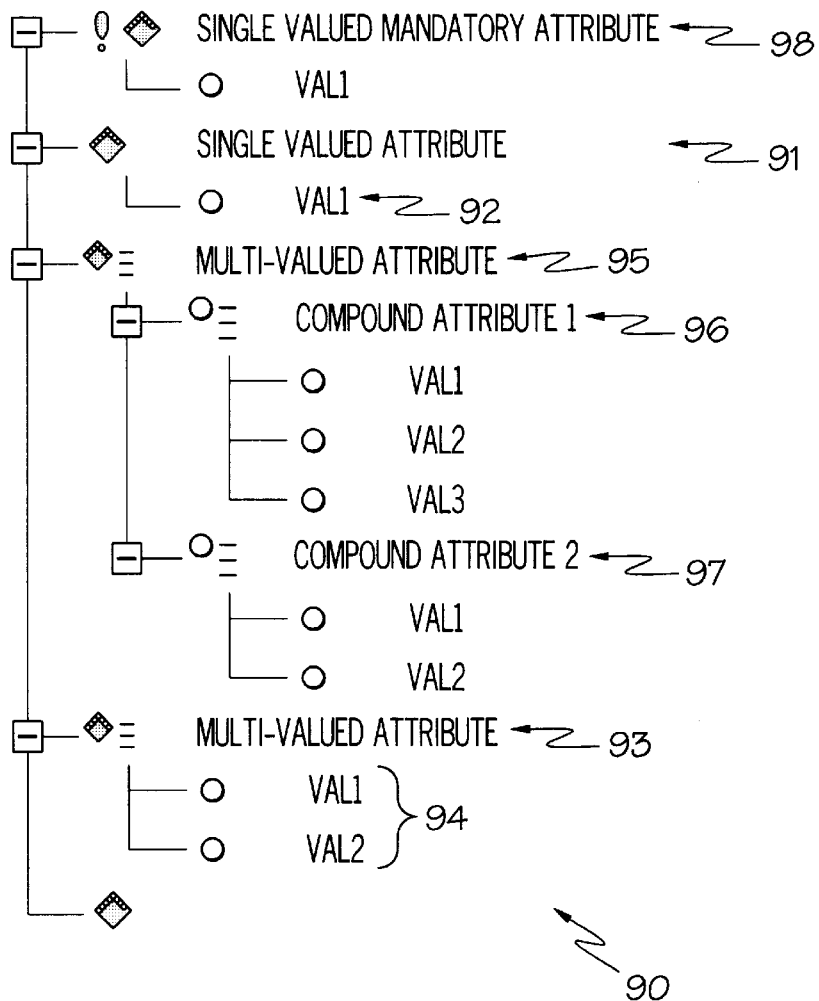
FIG. 7 depicts the organization of a tree structure for representing distributed directory attributes and associated values.

FIG. 7 illustrates one preferred organization of a tree structure for representing distributed directory attributes and associated values irrespective of the target object type or class. In this embodiment, each attribute and value representation includes both an iconic and a textual representation. An example of the single valued attribute is the attribute representation 91. This attribute representation 91 includes a diamond shaped icon and the textual description of the attribute. The associated value representation 91 has a circular icon along with a textual name corresponding to the associated value. Multivalued attributes are represented in a form similar to the attributes representation 93, which includes an icon having a diamond and a three horizontal lines, as well as a textural name of the multivalued attribute. Each of the multivalues are represented by individual value representations 94 having a form similar to the value representation 92.

Some distributed directories have compound attributes. Preferably, such compound attributes are displayed in a form similar to the attribute representation 95. Subordinate to the attribute representation 95 are two compound attribute representations 96, 97. Compound attribute representations 96, 97 have a circular icon coupled with three horizontal lines, as well as a textual description of the compound attribute. Subordinate to each compound attribute representation 96, 97 are a series of value representations taking a form similar to the value representation 92. Mandatory attributes, or attributes that require an associated value, are represented with an exclamation point "!" prefacing the icon, such as shown in the attribute representation 98.

Returning to FIG. 6, a variety of commands are available in the user interface 80. The four iconic buttons 85 enable a user to modify the attributes and values corresponding to the selected object representation 78. Attribute and value representations in the pane 82 can be selected with a single click of the mouse button. Starting from the top and working downwards, the first iconic button 85 corresponds to an Add command, which will display an appropriate syntax editor for a selected attribute representation to add new values. Alternatively, the Add command can be implemented by depressing the insert key on the keyboard. The second iconic button 85 corresponds to the Modify command, which will display an editor to modify the values for a selected value representation. Alternatively, the editor will be displayed upon double clicking on a value representation. The Add or Modify commands can be implemented with either separate editor dialog boxes, or with an in-line editor. The third iconic button 87 corresponds to the Delete command, which will delete a selected value. The Delete command can also be implemented upon the depression of the delete key on the keyboard. The fourth iconic button 85 corresponds to the Information command, which will display information about a selected attribute and its syntax.

The Okay command 86 submits any changes made to the attributes and values to the distributed directory and closes the user interface 80. Active control is returned to the user interface 70. The Okay command 86 can also be executed by depressing the enter key on the keyboard. The Cancel command 87, which can alternatively be implemented with the escape key, cancels any changes made during this session and since the last Apply command 88 was implemented, and also closes the user interface 80 returning control to the user interface 70. The Apply command 88 submits all changes to the distributed directory made since the last Apply command 88 was implemented and the user interface 80 will remain open. The Help command 89, which can alternatively be executed by depressing the F1 key, accesses the help system and displays appropriate help information.

The various commands in the user interface 80 will be available depending upon prior actions taken. For instance, the Add command is enabled only if an attribute representation is selected and the user has write rights on the corresponding attributes/value. The Modified command is enabled when a value representation is selected and the user has read or write rights on the corresponding attributes/value. If an attribute value is read only, the attribute editor is represented in a read only mode so that the user does not have an option of changing the associated value. The Delete command is enabled only when a value/representation is selected and the user has write rights on the corresponding attributes/value. The Information command is always enabled unless there is no attribute or value representation selected.

One preferred embodiment of the user interface 80 uses both in-line editors and advanced editors. For instance, a double mouse click as a value representation activates an in-line editor for that value, while the Modify command 85 activates the advanced editor. An in-line editor appears over a value representation and allows a user to modify the value directly in the pane 82 without having to go through a separate dialog box. After modifications have been made to a value representation, the enter key accepts the changes and closes the in-line editor. The escape key cancels all changes made to the value representation. A mouse click outside the in-line editor accepts and closes the editor. However, if the field is blank and "blank" is an acceptable value, then that value is saved as such. Otherwise, "blank" is not an acceptable value then the note is deleted.

When adding values for attributes having two or more fields required for the attribute value to be complete, each value representation of the multivalued attribute is created in the tree structure in the pane 82. The in-line editor is then displayed for the first value representation. On enter, the in-line editor is closed on the first value representation, then displayed on the second value representation, and so on until all required values are entered. On the last required value representation, the enter key accepts the entered value and closes the in-line editor. If escape is pressed anytime during the process the Add command is canceled, unless a value set is valid.

A plurality of advanced editor dialogs provide the ability to edit an attribute value with an editor specific to the syntax of a selected attribute or value representation. Preferably, the advanced editors take the form of a separate dialog box for editing values. The advanced editors each correspond to one or more attribute syntaxes.

Figure 8:
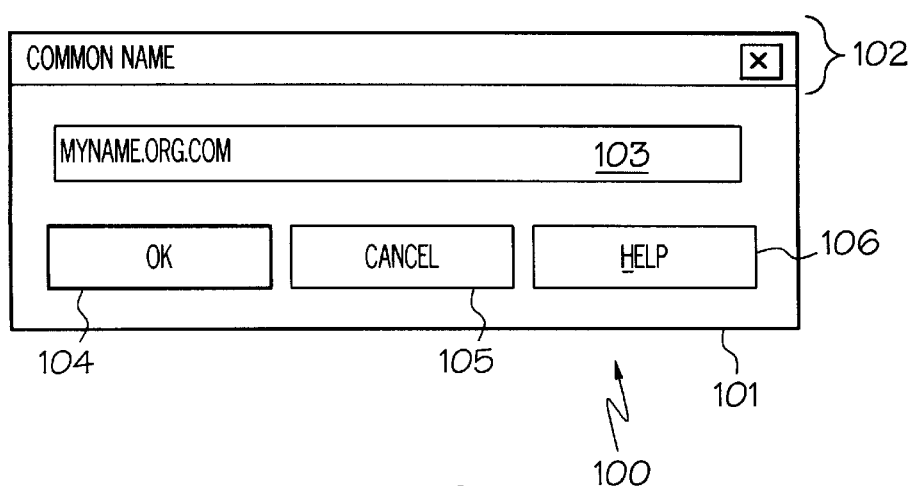
FIG. 8 depicts an editor for viewing and modifying a string value.

FIG. 8 displays an advanced syntax editor 100 in the form of a dialog box. Upon the selection of the attribute representation 83 or the value representation 84, in combination with the Modify command, the syntax editor 100 is displayed over the user interface 80. The syntax editor 100 is bound within the display area 101. Preferably, a header portion 102 includes the names of the attribute corresponding to the selected attribute representation 83. An edit field 103 displays the current value associated with the attribute corresponding to the selected attribute representation 83, and is adapted to receive inputs from a human user to alter the associated value. In this example, the edit field 103 is adapted to edit string values. However, a variety of other different types of syntaxes could be adapted for editing in the field 103. If an entry is attempted that does not comply with the attribute syntax, an appropriate error message or audible warning will result. Preferably, the field 103 will be pre-formatted for the corresponding syntax. For instance, the time or date syntaxes will have appropriate colons or slashes formatted into the field 103 where appropriate. When the Okay button 104 is depressed any such changes in the field 103 are reflected in the value representation 84 and the syntax editor 100 is closed. The Cancel button 105 closes the syntax editor 100 without making any changes to the value representation 84. The Help button 106 provides information relative to the editor 100, and the syntax, and the corresponding attribute.

Preferably, the appropriate syntax editor is dependant upon syntax of a selected attribute and not the type of object or the class from which the object was created. Therefore, the same editor could be presented for two different distributed directory object types. For instance, FIG. 9 displays a syntax editor 110 appropriate for editing hex values. The editor 110 is bound within a display area 111 and has a header portion 112 describing the attribute. Appropriate editable field 113 is adapted to receive inputs from a human user for changing the value associated with the selected attribute. This editor 110 could be used for any hex syntax attribute, regardless of the class from which the object was created. On the other hand, the editor 100 could be used for any string attribute, regardless of the class from which the object was created.

Returning to FIG. 5, the user interface 70 can be used to view or modify the distributed directory. Examples of such modifications include creating new objects, changing object properties, renaming objects, moving objects, or deleting objects. Any of these options can be implemented through appropriate commands such as menu options, buttons, keyboard inputs, pointer selections, etc. For instance, upon the selection of an object representation, coupled with appropriate Delete command, that select object can be removed from the distributed directory. If a container object is selected for deletion, all the subordinate objects would be deleted. Preferably, before any objects are deleted an appropriate dialog box will be presented asking "Are you sure you want to delete the selected object", presenting a yes/no option for the user. Likewise, objects in a distributed directory can be renamed by selecting an object representation coupled with an appropriate Rename command. An in-line editor is then presented over the object representation, or alternatively a separate dialog box in a configuration similar to the syntax editor 100 could be presented.

Figure 10:
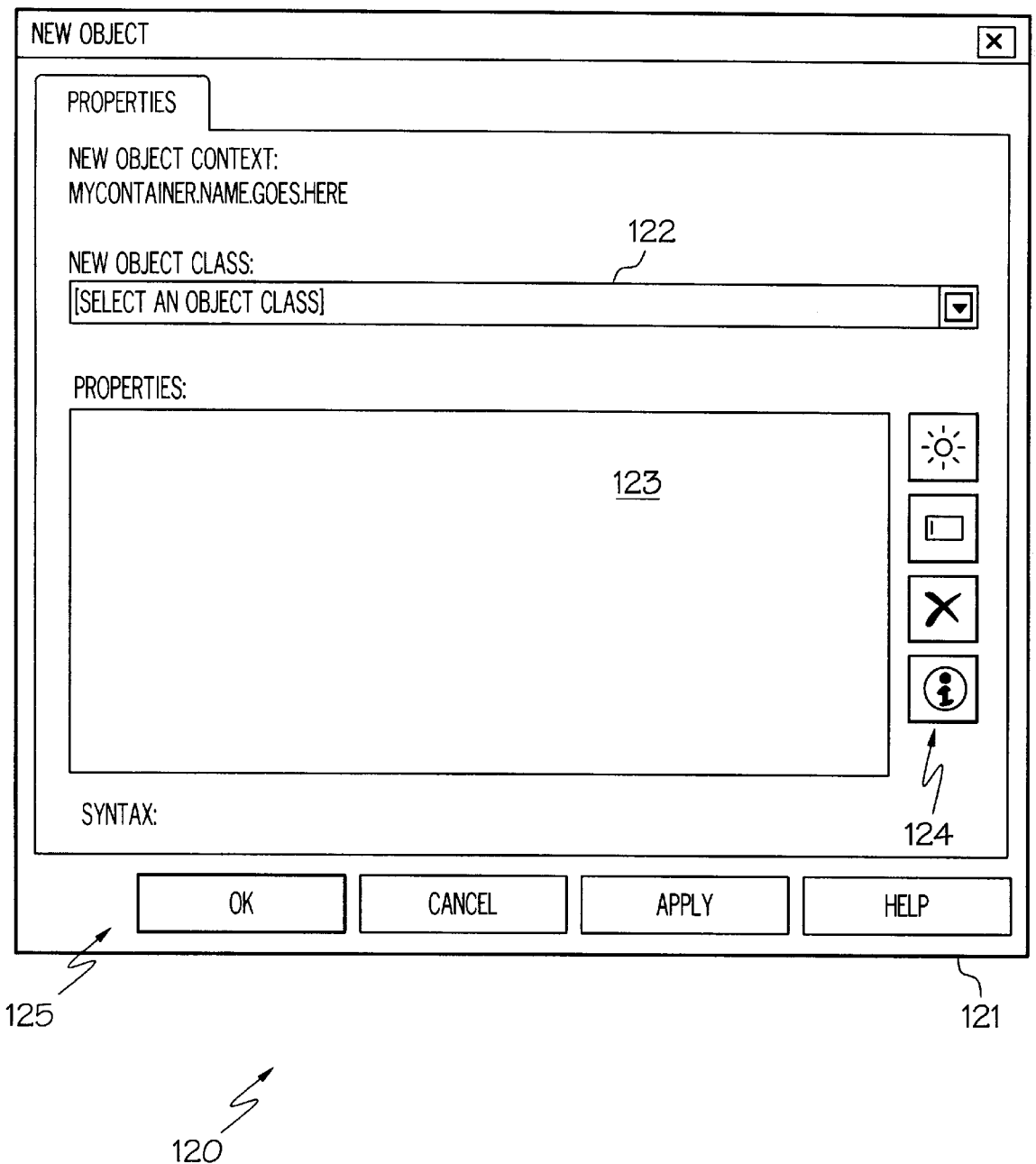
FIG. 10 depicts an extension of the user interface of FIG. 5 for adding new objects to the distributed directory.

Upon the selection of a container object representation in the user interface 70, coupled with an Add Object command, a new object dialog 120 as shown in FIG. 10 is presented. A new object dialog 120 is framed within a display area 122. The drop-down list box 122 provides the user with an array of different object classes from which the new object can be created. Once the object class is selected, attribute representations corresponding to the attributes in the selected class are populated in a list form, preferably in a tree structure, within the pane 123. All mandatory attributes are indicated with an exclamation point image along side the icon within the attribute representation. The Okay and Apply commands remain disabled until all mandatory attributes have associated values. In many respects, the new object dialog 120 is very similar to the user interface 80. The iconic buttons 124 and the text buttons 125 have the identical functionality as the user interface 80.

Figure 11:
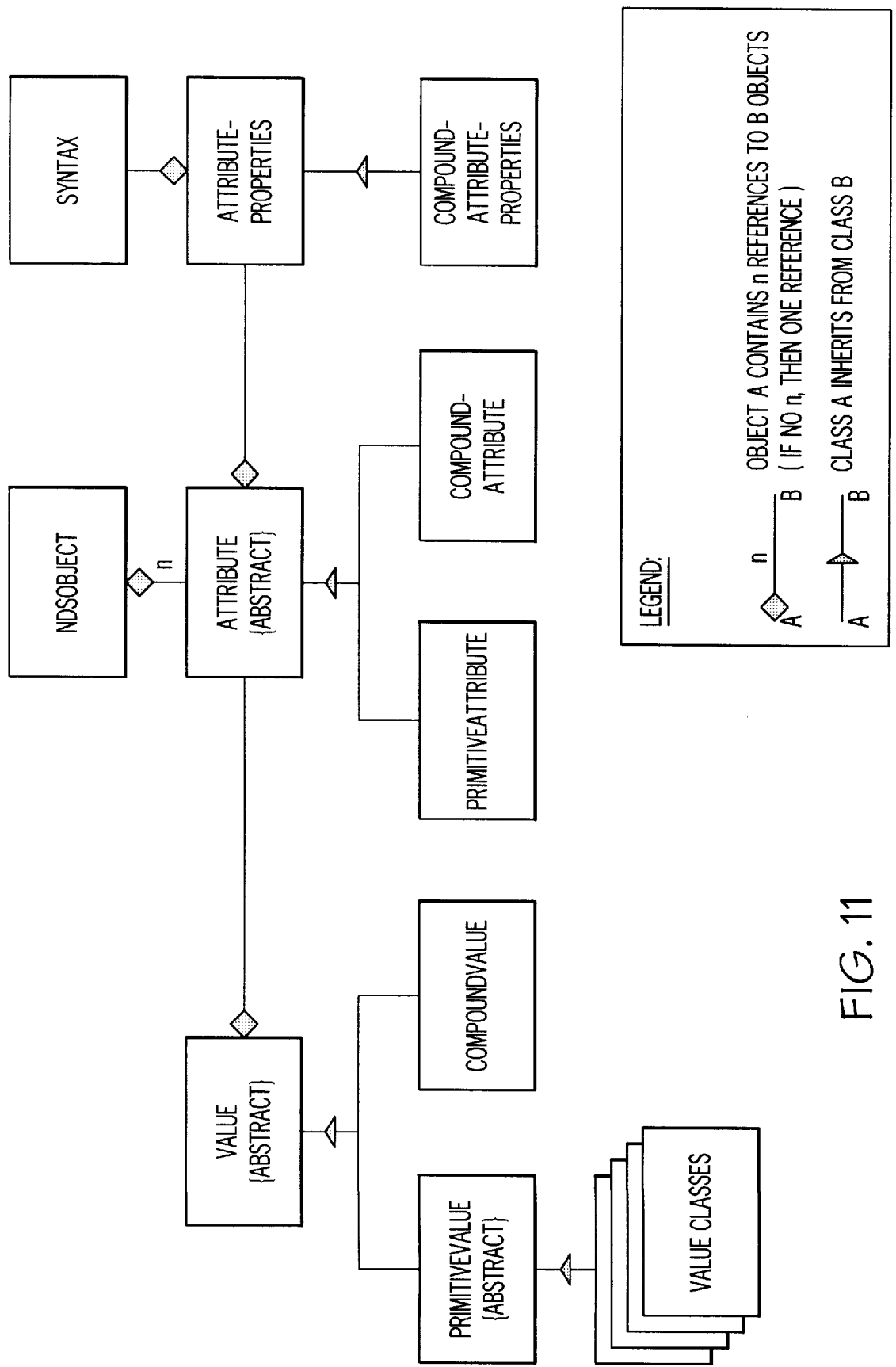
FIG. 11 depicts a class diagram of an object oriented structure for representing one or more distributed directory objects.

A data structure represents the objects, attributes and values of the distributed directory in the computer on which the user interface 70 is executing. The user interface 70 displays portions of the data structure as object, attribute and value representations. In one embodiment, the data structure is implemented with an object oriented programing language such as JAVA or C++. As one with ordinary skill in the art will readily appreciate, object oriented programming provides the advantages of the three principles of encapsulation, polymorphism and inheritance. Objects are instantiated from the hierarchical set of classes, each of which contain data members and method members used to manipulate the objects. FIG. 11 illustrates one of many suitable object oriented structures for representing distributed directory objects. The class diagram uses a modified Booch and OMT notations for representing the various object classes and the interrelationships between the objects instantiated from the classes. As referenced in the legend of FIG. 11, the relationship between the classes and objects instantiated from the classes are represented with interconnected lines and arrows.

Instances of the class NDS Object represent individual distributed directory objects and have references to one or more objects instantiated from the class Attribute. Objects instantiated from the Attribute class represent individual attributes of distributed directory objects and manage objects instantiated from the class Value. The classes Primitive Attribute and Compound Attribute each inherit from the class Attribute, and objects instantiated from these classes are designed to represent primitive attributes and compound attributes, respectively. Objects instantiated from the class Attribute maintain a reference to an object instantiated from the class AttributeProperties, which represents the properties of the corresponding attribute. The class CompoundAttributeProperties inherits from the class AttributeProperties. Objects instantiated from the AttributeProperties class maintain a reference to objects instantiated from the class Syntax. Instances of the Syntax class model the characteristics of a single syntax of the corresponding attribute in the distributed directory, including implicit cardinality, constraints, and other properties documented in the schema specification.

Figure 12:
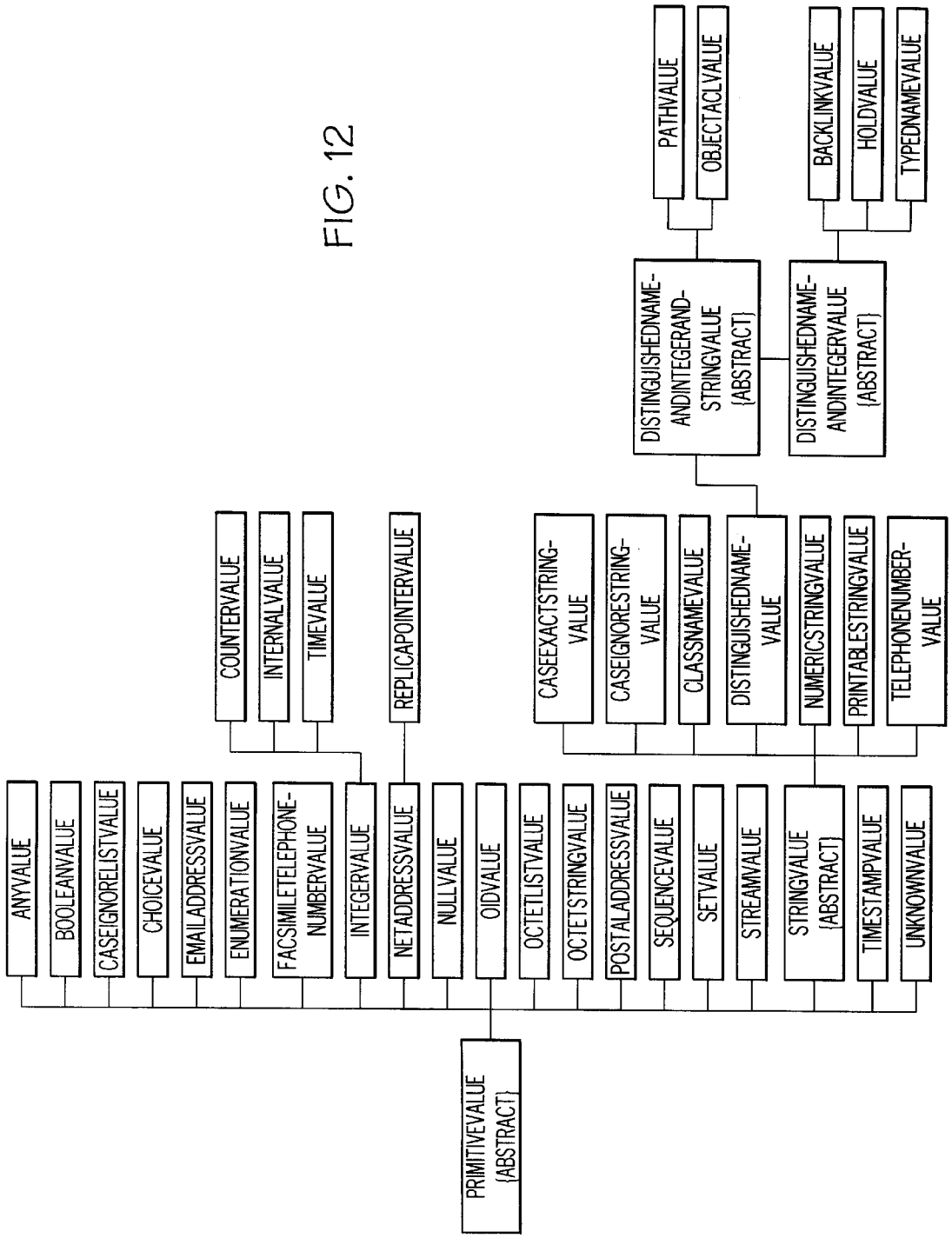
FIG. 12 depicts a class hierarchy of object oriented classes for representing values corresponding to attribute syntaxes.

Instances of the class Value represent values associated with the attributes of distributed directory objects. Such values are associated with the attribute being represented an instance of the Attribute class. Value objects each have a reference to its corresponding Attribute object. The classes PrimitiveValue and CompoundValue each inherit from the Value class. An Attribute instantiated from such classes represent primitive values and compound values in the distributed directory, respectively. Class Value is the root of a hierarchy of classes that represent a single value of an attribute. A Value object is a raw data buffer with method members to interpret the raw representation as native JAVA types. Each syntax is represented by a sub-class of the Value class. Syntax editors operate upon instances of the Value classes. The Value classes adapt the interface of the NDK for JAVA to the interface understood by the syntax editors. FIG. 12 illustrates an inheritance graph of the derived Value classes. Each of these derived classes correspond to at least one attribute syntax in the distributed directory.

Class Attribute is essentially a container of Value objects with an additional state to represent the properties of the attribute. Attribute instances are constructed from data supplied by an agent external to the class constructor. Once an instance of class Attribute is built, the external agent populates it with the Value objects representing the associated values read from the distributed directory. The agent reads raw value data and passes it to an Attribute method for adding a value object. The Attribute instance builds an appropriate instance of Value and adds that instance to the Attribute's list of values to be managed. In this embodiment, an Attribute instance may manage only Value instances which it has created. Likewise, Value instances can only be constructed by a parent Attribute instance. This parent relationship is fixed for the lifetime of the Value object. The parent relationship is also independent of whether the Value is managed by an Attribute instance.

Figure 13:
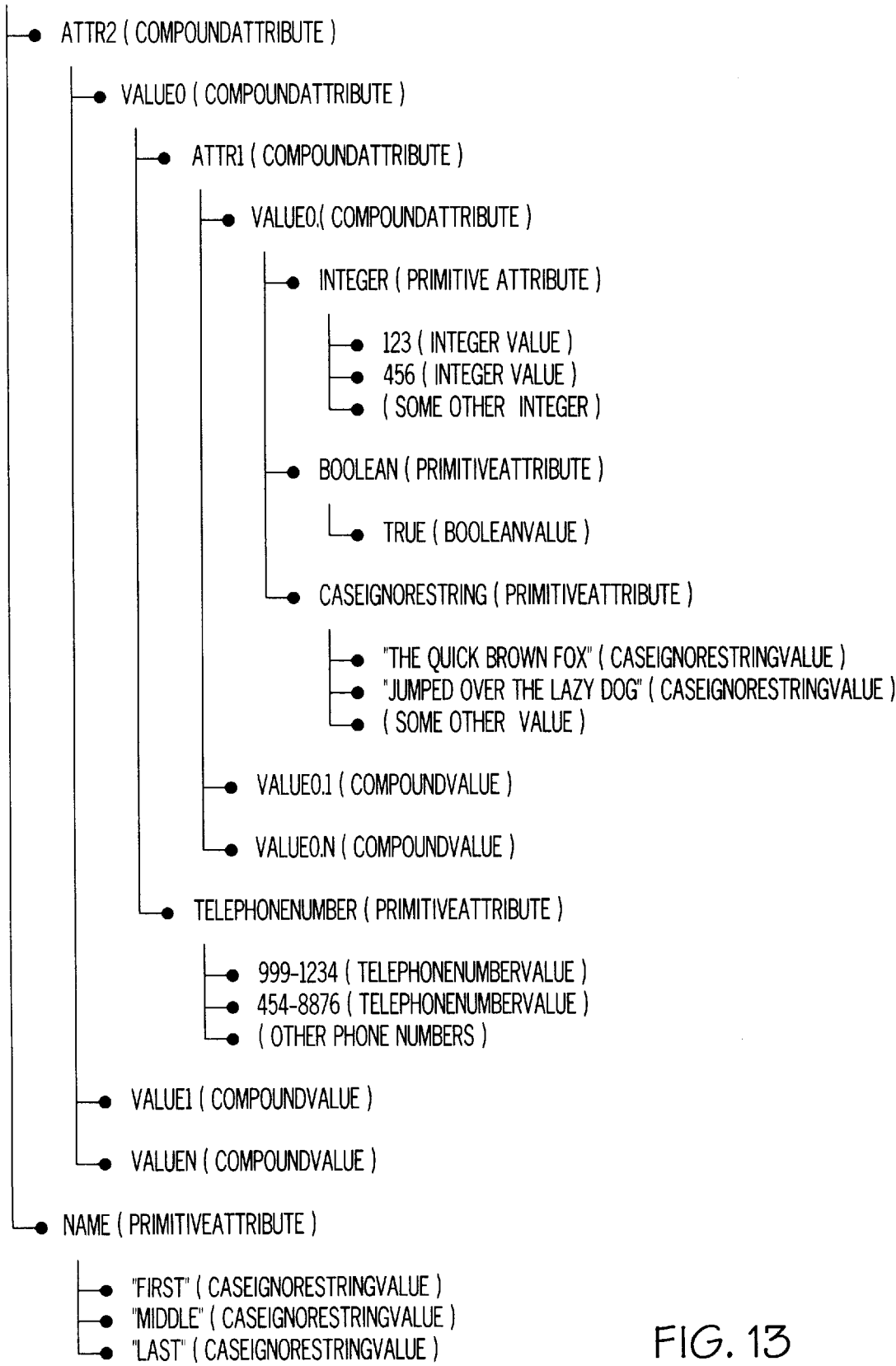
FIG. 13 illustrates an example of instances of object oriented classes for representing a distributed directory object.

FIG. 13 illustrates one example of how the object oriented class hierarchy of FIG. 11 can be used to represent distributed directory objects. Within FIG. 13, each line of text represents an instance of the class corresponding to the adjacent in the parenthetical. FIG. 13 also illustrates how compound attributes are represented within the object oriented class hierarchy. For instance, the object Attribute2 contains the objects Value0, Value1 and Value2. Likewise, Value0 contains Attr1 and Telephone Number.

Instances of the Attribute class maintain two lists of Value objects referred to as the "live values" and "deleted value" lists. Deleted values are those that are to be deleted from the attributes value set when changes are saved to the distributed directory. Live values comprise new values to be added to the attributes value set in the distributed directory, and modified values to be altered. Attribute objects manage these two lists with its method Add Value, Delete Value and Modify Value. The two lists and the way that they are managed are used to determine the minimum set of changes to increase the efficiency of the distributed directory.

The live list comprises all non-deleted values of an attribute. The live list includes the set of values that will become the new state of the attribute when the data structure are recorded in the distributed directory. The delete list includes all original values to be deleted from the attribute when the data structures are recorded in the distributed directory. The delete list provides two capabilities. First, the ability to maintain a minimal set of transactions and second, the ability to provide the original values which is required by some distributed directories, such as NDS, to execute a deletion transaction. When values are modified, they are linked to the original value that they had modified. Maintaining the link to the original value provides the capability to maintain a minimal set of transactions and provides the information necessary to make the modification permanent in the distributed directory. The modification operations in some distributed directories, such as NDS, require specification of the original value and its new value to perform the modification transaction in the distributed directory.

FIGS. 14a–14e illustrate several scenarios for handling an Add command from the user interface 70. In each of these scenarios, the minimum set is determined. Each of the squares with numbers indicate different values. Values without cropped corners, such as values 1, and 2 of FIG. 14a, denote original values read from the distributed directory, which are being represented in the data structure. Any changes made to the data structure (e.g., add, modify or delete) are denoted with a cropped corner, such as value 2 in FIG. 14b. Values maintained in the live list are placed under the "live" caption. Likewise, values in the delete list are placed under the "delete" caption. Values which are newly added for consideration are placed under the "new" caption.

Figure 14A:
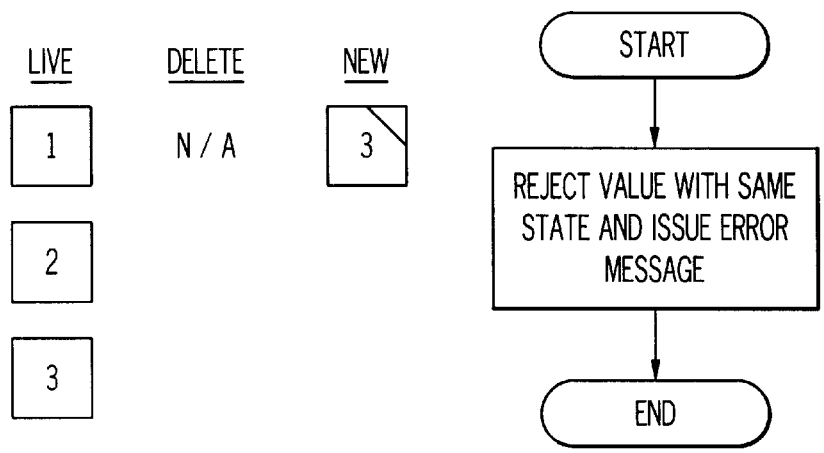
FIGS. 14A–E depict several methods and systems for determining the minimal set when a value is added.

FIG. 14a illustrates how to handle a new value which is already in the live list. As shown here, the new value 3, is the same as the original value 3 is already in the live list. When this scenario occurs, the new value 3 is rejected and an error message is issued to the user.

Figure 14B:
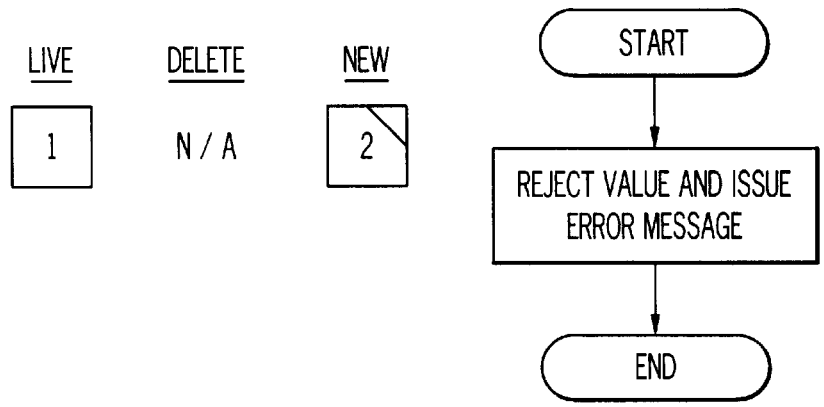

FIG. 14b illustrates the scenario when a new value is requested to be added to an attribute which is defined as a single value attribute, and when a value is already present in the live list. As shown here, new value 2 is under consideration, however, value 1 is already in the live list. When this scenario occurs the new value 2 is rejected and an error message is issued to the user.

Figure 14C:
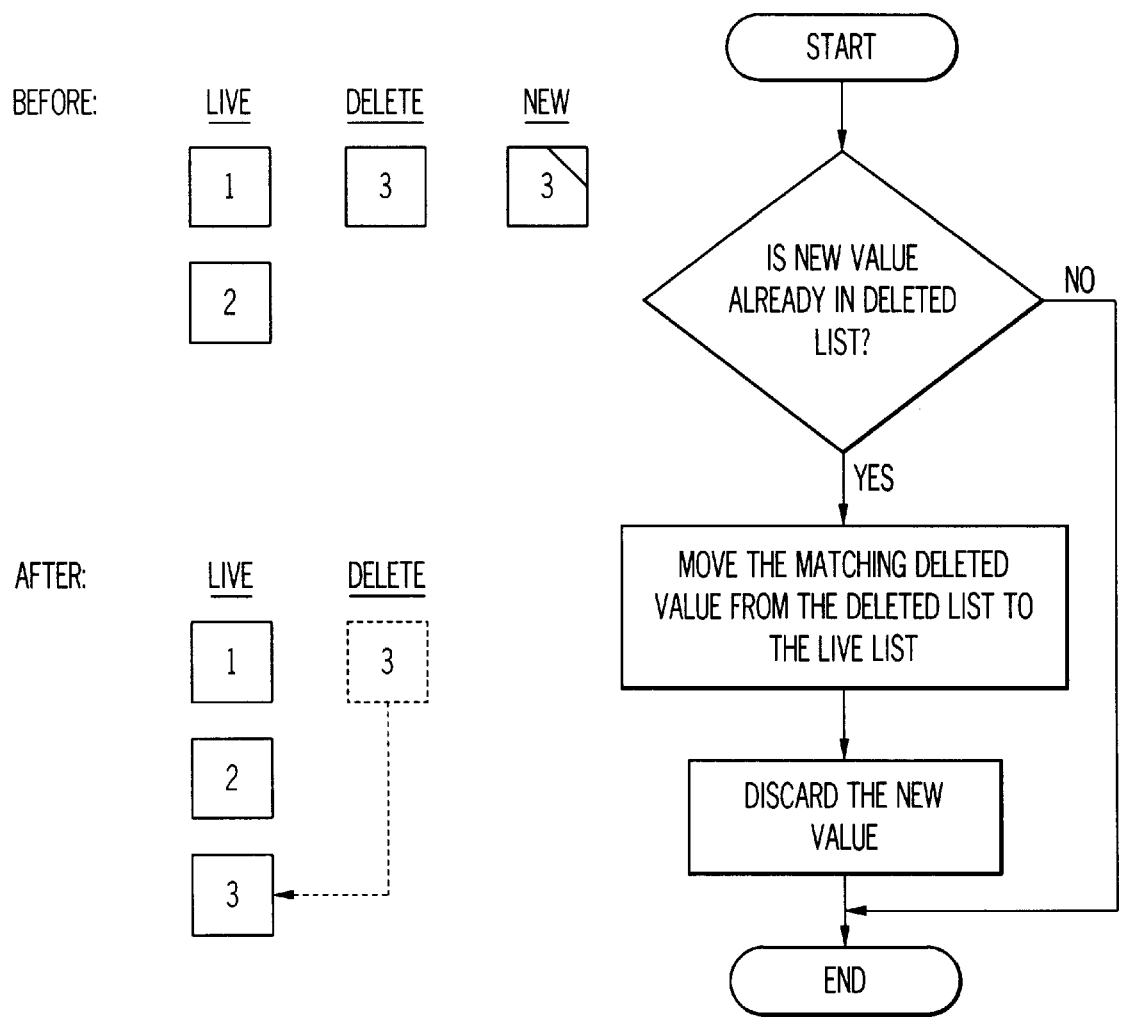

FIG. 14c illustrates the scenario when a new value is added which is present in the delete list, which occurred as a result of a prior deletion action. The Before view shows that the new value 3 is the same as the original value 3 in the delete list. As illustrated with the dotted lines in the After view, such a scenario is handled by moving the original value 3 from the delete list back to the live list and discarding the new value 3.

Figure 14D:
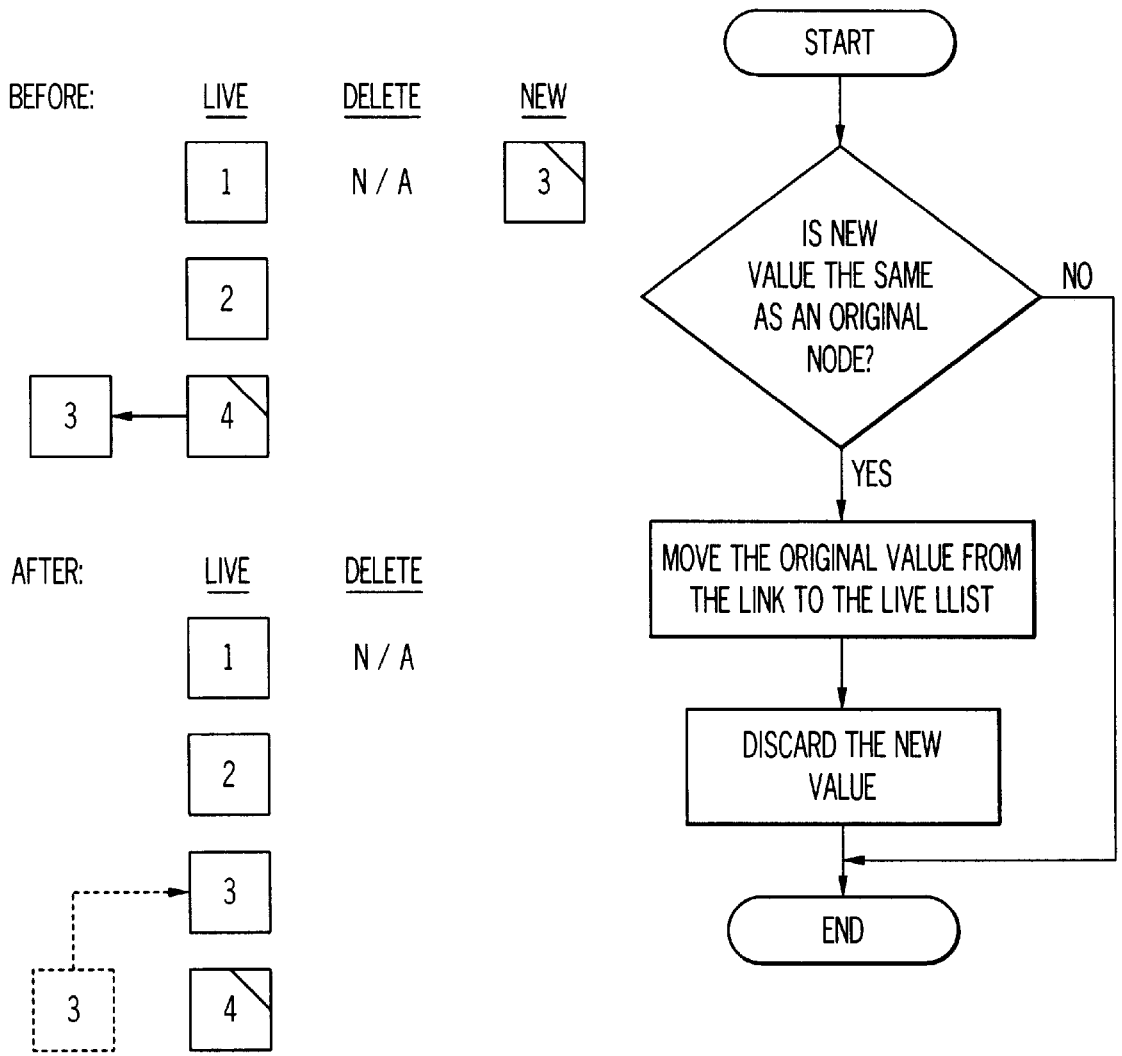

FIG. 14d illustrates the scenario when a new value is presented which is the same as an original value that had been modified in the live list. The Before view indicates that the original value 3 had been modified to the new value 4. As indicated by the arrow, the new value 4 maintains a link to the original value 3. As indicated in the After view, when a new value 3 is added, the original value 3 is moved back to the live list and the new value 3 is discarded.

Figure 14E:
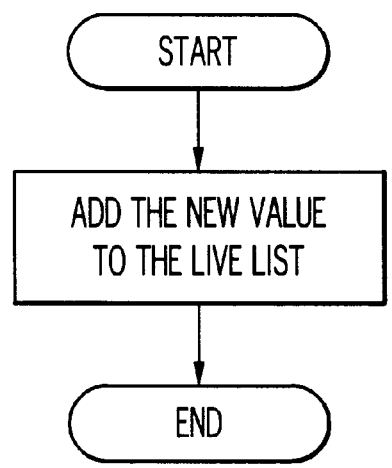

FIG. 14e illustrates how to handle a new value that does not fit into any of the above scenarios. As shown in the Before view, the new value 4 is requested to be added. As shown in the After view, the new value 4 is simply added to the live list.

Figure 15A:
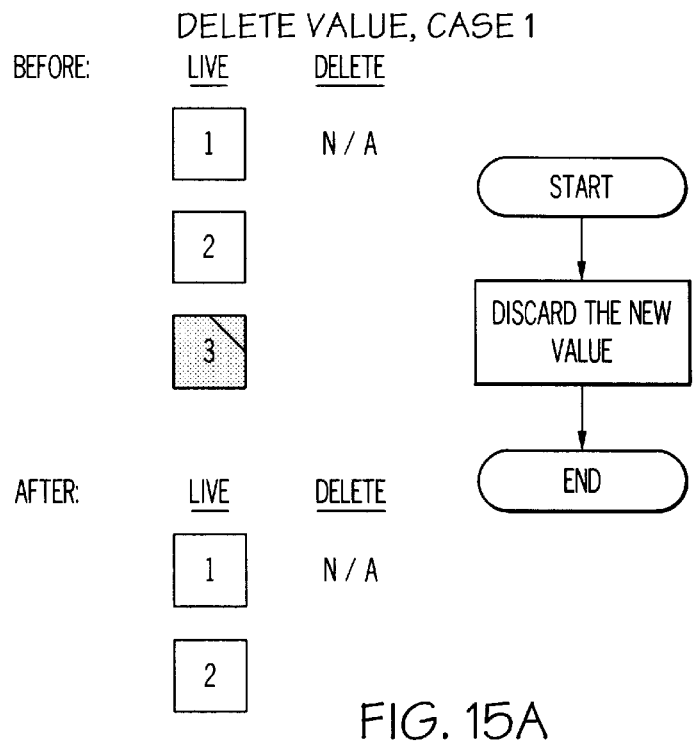
FIGS. 15A–C depict several methods and systems for determining the minimal set when a value is deleted.

FIG. 15a illustrates how to handle a Delete command from the user interface 80, which is directed towards a new value in the live list. As shown in the Before view, the new value 3 has been selected to be deleted from the live list. In this situation, the new value 3 is discarded.

Figure 15B:
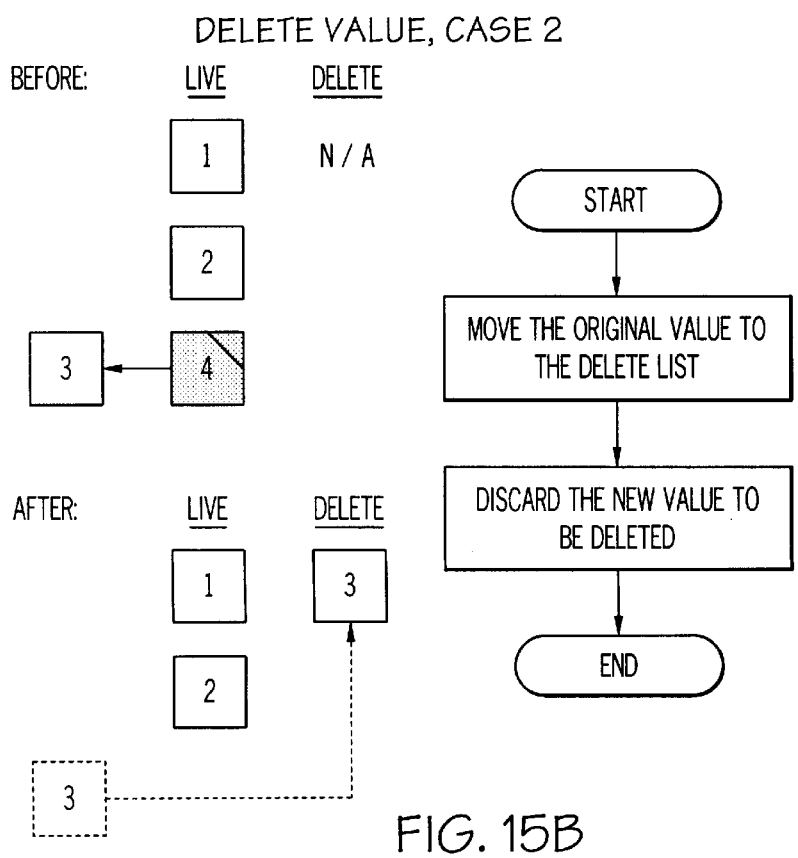

FIG. 15b illustrates how to handle when a delete request is directed to a new nod on the live list that is modifying an original value. As shown in the before illustration, the new value 4 is selected to be deleted. This new value 4 modified the original value 3 and therefore has a link to the original value 3. This scenario is handled by moving the original value 3 to the delete list, as illustrated by the dotted line in the After view, and discarding the new value 4.

Figure 15C:
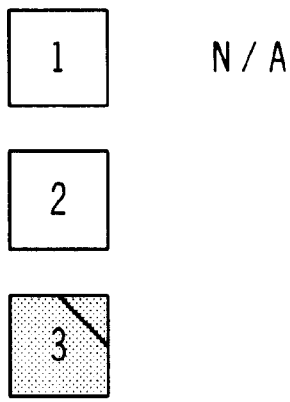
Figure 15C:
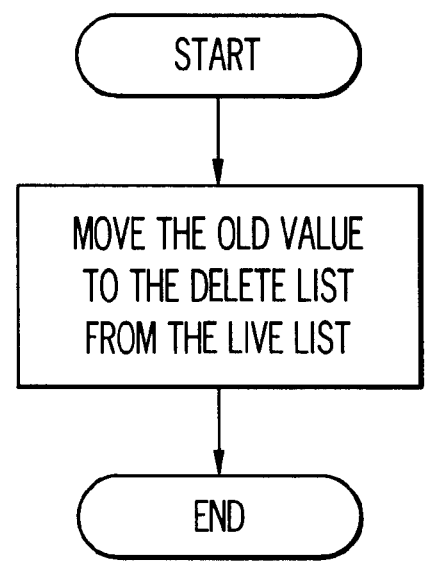
Figure 15C:
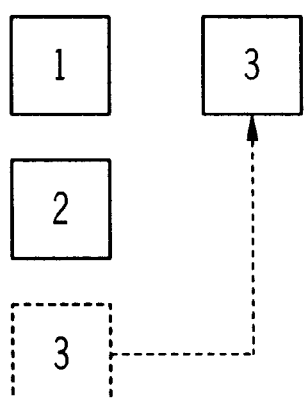

FIG. 15c illustrates how to handle the deletion of an original value in the live list. As shown in the Before view, original value 3 has been selected for deletion. In this situation, the original value 3 is moved to the delete list, as illustrated by the dotted line in the After view.

There are eight basic scenarios when modifying values in response to a Modify command from the user interface 80. Case 1 involves modifying an original value. Case 2 involves modifying a new value, which has an original value linked to it (i.e., modifying a modification). Case 3 involves modifying an original value where the new version is the same as an original value somewhere on the live list. Case 4 involves modifying a new value which has an original value linked to it, and the new version is the same as an original value elsewhere on the live list. Case 5 involves modifying an original value wherein the new version is the same as an original value in the delete list. Case 6 involves modifying a new value which has an original value linked to it, wherein the new version is the same as a value in the delete list. Case 7 involves modifying an original value where the new version matches the original value. This scenario is impossible since original values never have a link. Case 8 involves modifying a new value which has an original value linked to it, wherein the new version matches the original value.

Figure 16:
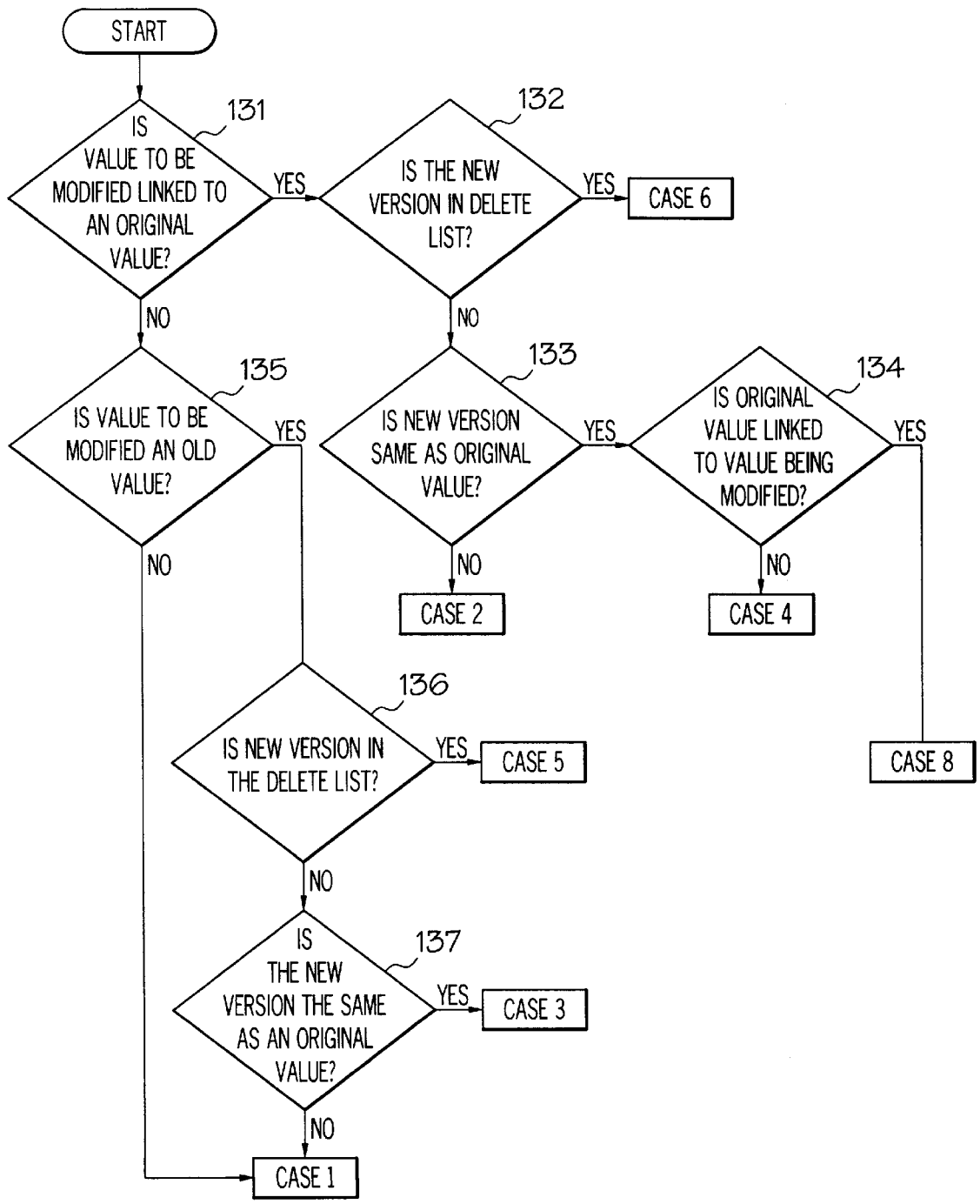
FIG. 16 depicts a flowchart to determine the case variation when a value is modified.

FIG. 16 depicts a flow chart of an algorithm to determine which of the various modification cases applies. Starting with the decision block 131, it is determined whether the value to be modified is linked to an original value. If so, the algorithm proceeds to the decision block 132 to determine if the new version is in the delete list. If the new version is in the delete list, the modify scenario is Case 6. On the other hand, if the new version is not in the delete list, decision block 133 determines whether the new version is the same as an original value. If not, Case 2 applies. On the other hand, if the new version is the same as the original value, the algorithm proceeds to decision block 134 to determine if the original value is linked to a value being modified. If so, Case 8 applies, and if not Case 4 applies.

Returning to decision block 131, if the value to be modified is not linked to an original value, decision block 135 determines if the value to be modified is an old value. If not, Case 1 applies. If the value to be modified is an old value, decision block 136 determines if the new version is in the delete list. If so, Case 5 applies. If not, decision block 137 determines if the new version is the same as an original value. If so, Case 3 applies, and if not Case 1 applies.

Figure 17A:
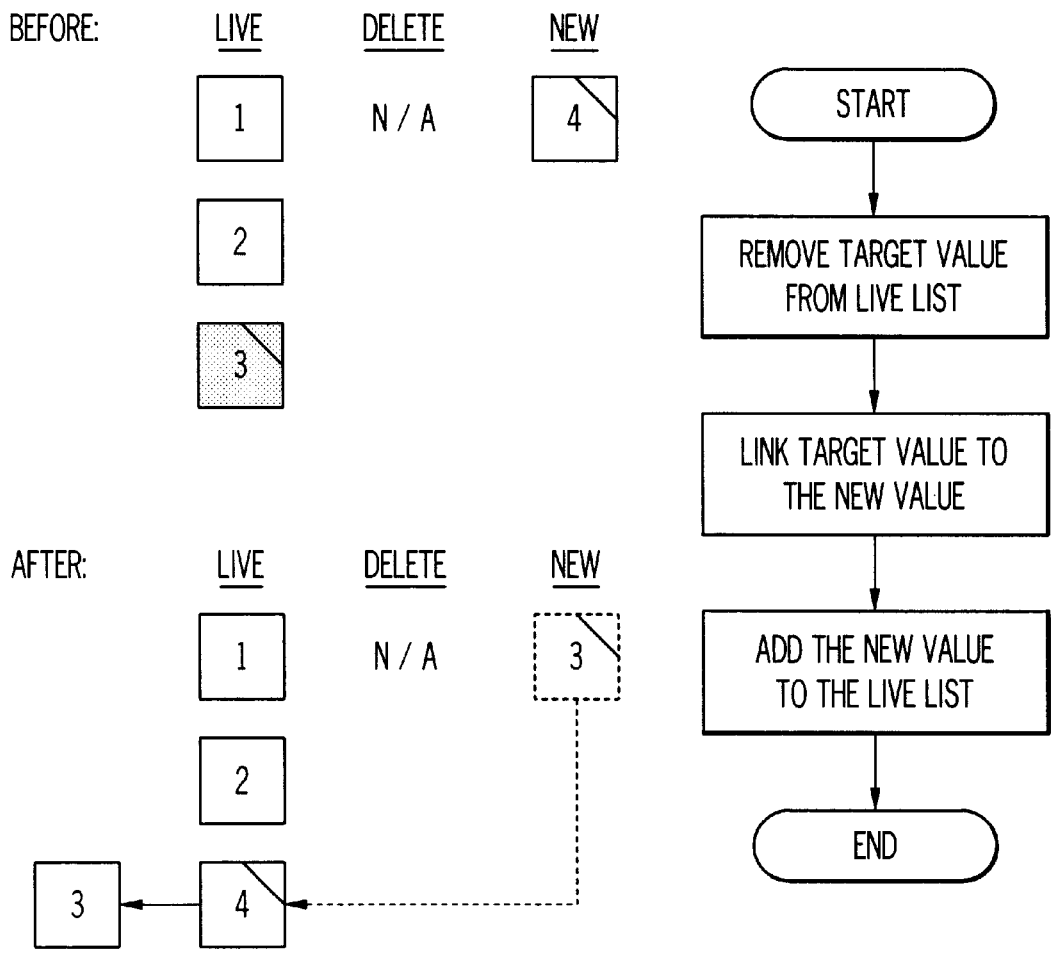
FIGS. 17A–G depict several methods and systems for determining the minimal set when a value is modified.

FIG. 17a illustrates Case 1 of the value modification scenarios. The target value 3 is an original value which is being replaced with new value 4. As depicted in the After view, the target value 3 is moved from the live list. The original value 3 is linked to the new value 4 and the new value 4 is added to the live list.

Figure 17B:
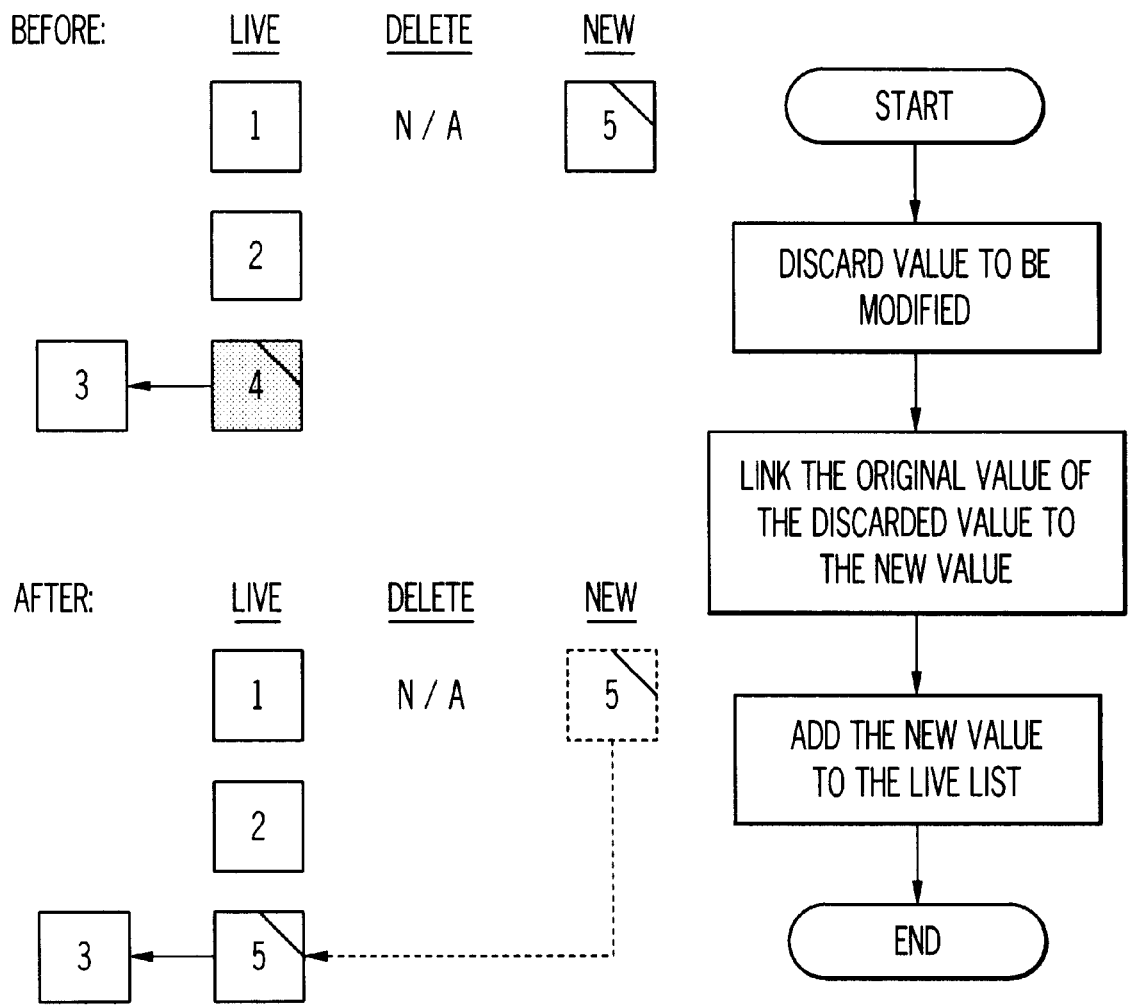

FIG. 17b illustrates how to handle modification Case 2. Here the target object is new value 4 which has a link to original value 3. New value 4 is being replaced with the new value 5. As shown in the After view, this scenario is handled by discarding the new value 4 and linking the new value 5 to the original value 3. The new value 5 is added to the live list.

Figure 17C:
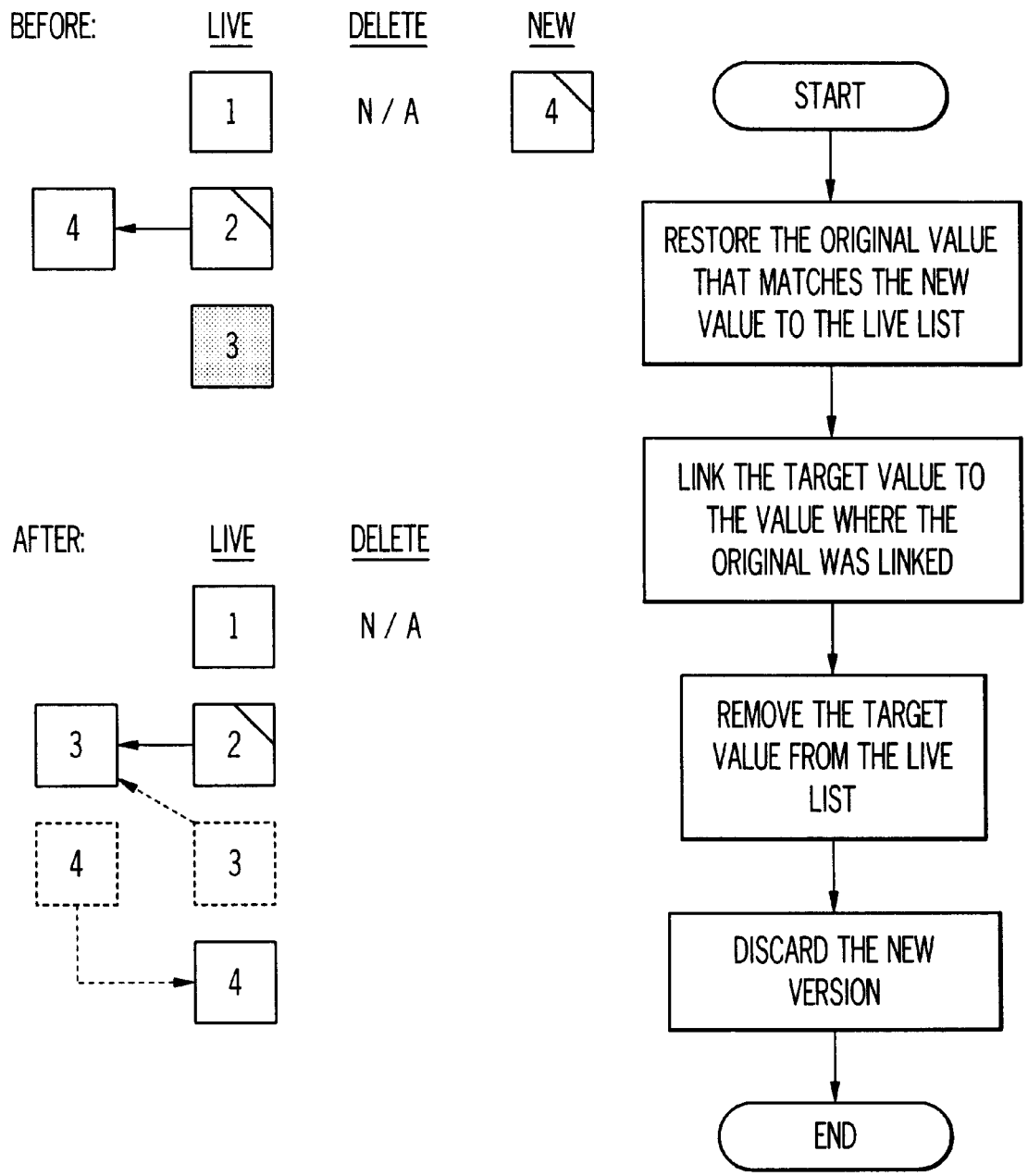

FIG. 17c illustrates how to handle modification Case 3. As shown in the Before view, the target value is original value 3, which is being replaced with new value 4. However, original value 4, which is identical to new value 4, has a link to new value 2 in the live list. As shown in the After view, the original value 4 is restored to the live list. The target value 3 is removed from the live list and linked to the new value 2. The new value 4 is then discarded.

Figure 17D:
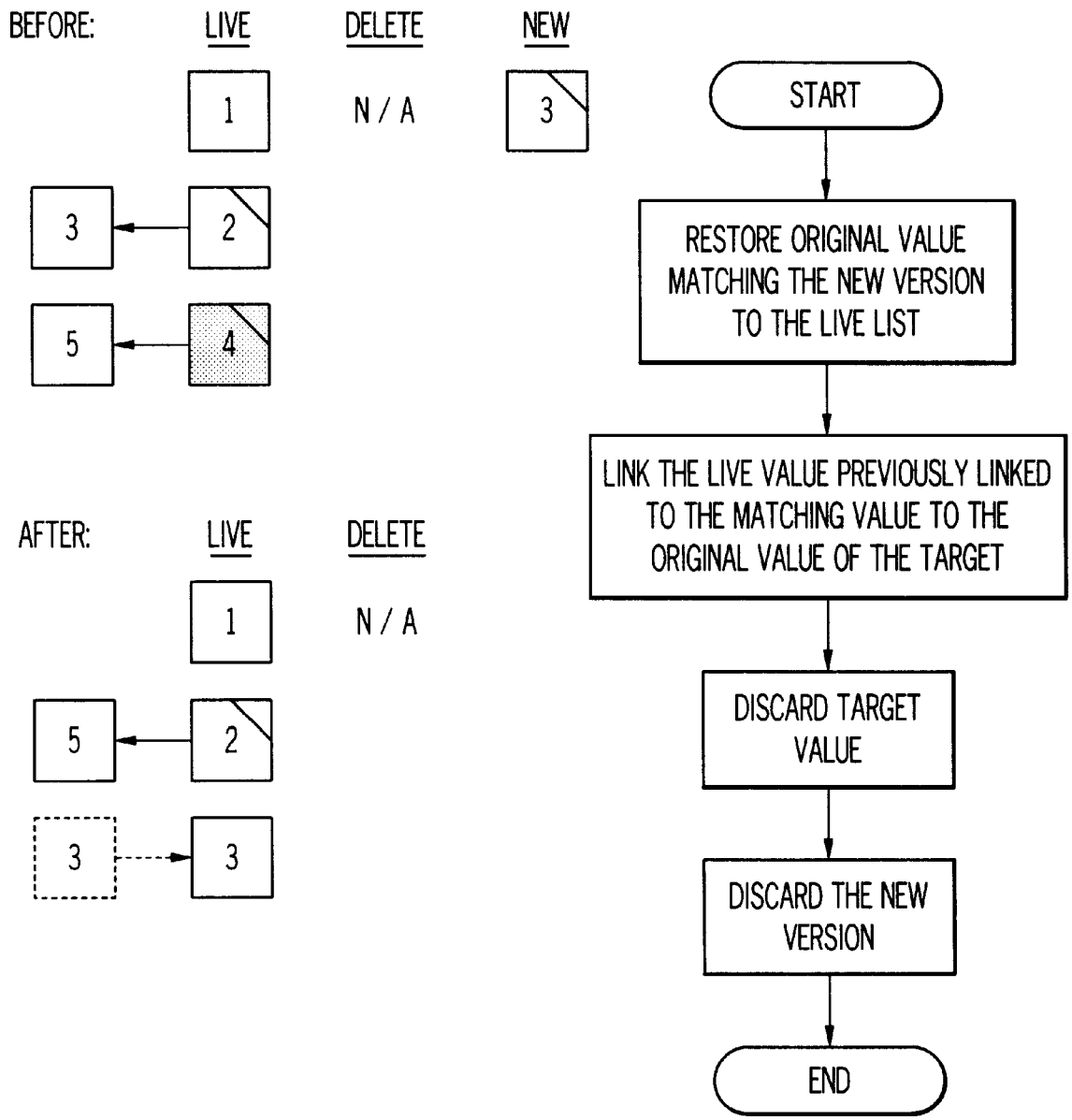

FIG. 17d illustrates modification Case 4. As shown in the Before view, the target value is new value 4 which has a link to original value 5. The target value is being replaced with new value 3, which is identical to original value 3. Original value 3, however, has been replaced with and has a link to new value 2 in the live list. As shown in the After view, the original value 3 is restored to the live list. Original value 5 is then linked to the new value 2 in the live list. The new values 3 and 4 are discarded.

Figure 17E:
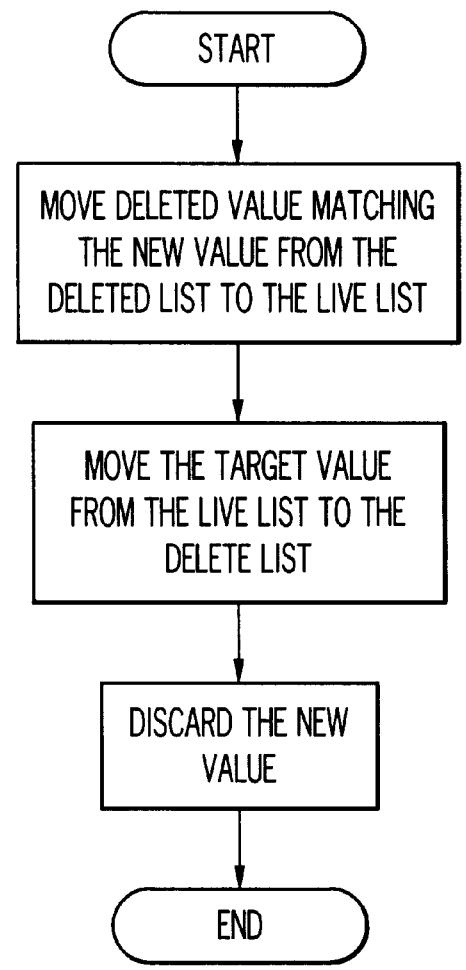

FIG. 17e illustrates modification Case 5. As shown in the Before view, the target value is original value 3, which is being replaced with new value 4. However, original value 4 has previously been moved to the delete list. As shown in the After view, Case 5 is handled by moving the original value 4 to the live list and moving the original value 3 to the delete list. The new value 4 is then discarded.

Figure 17F:
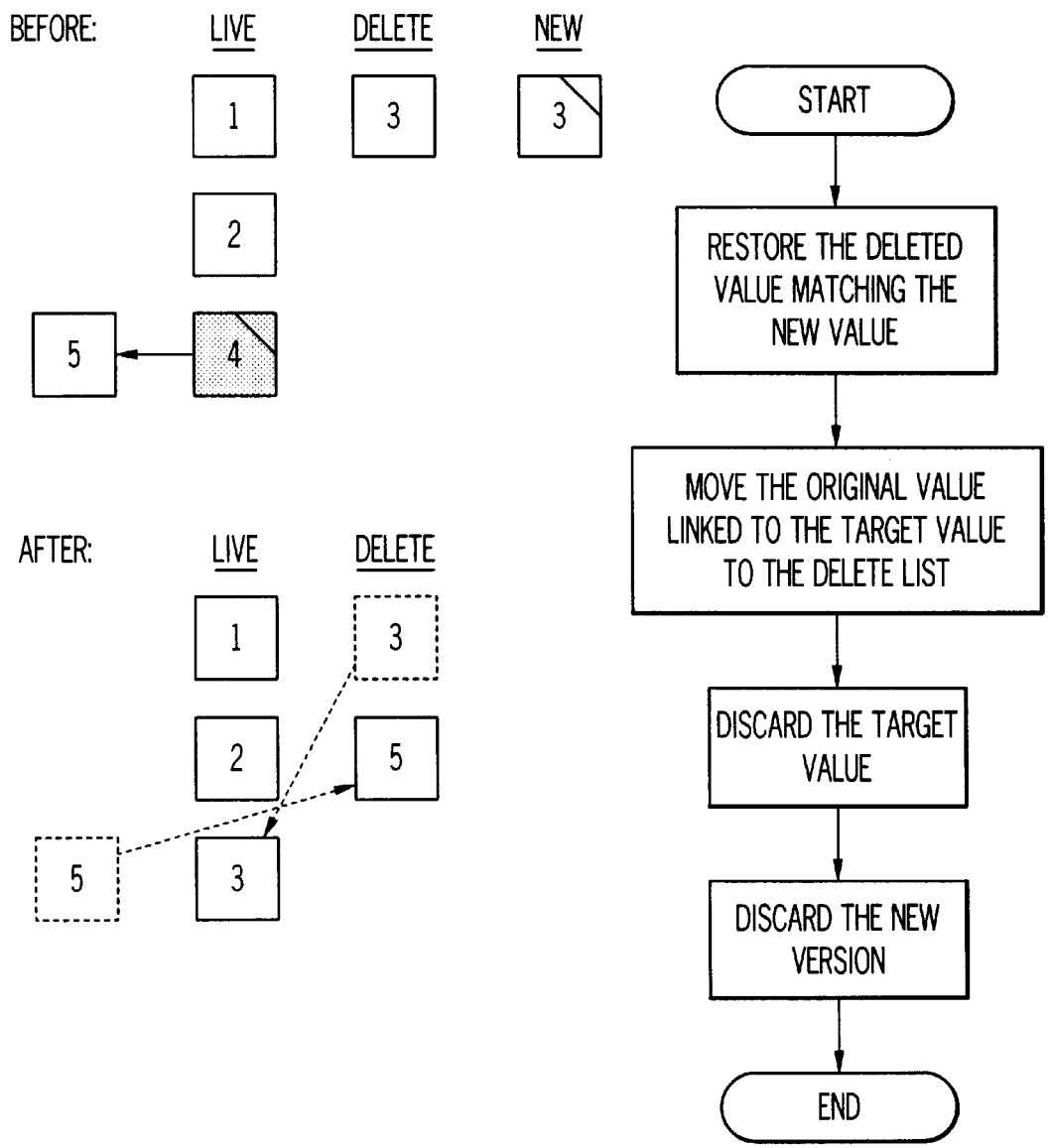

FIG. 17f demonstrates how to handle modification Case 6. As shown in the Before view, the target value is new value 4, which has previously replaced and currently has a link to original value 5. The target value is being replaced with the new value 3, however, the new value 3 is identical to the original value 3 in the delete list. As shown in the After view, Case 6 is handled by restoring the deleted value 3 to the live list. The original value 5 is moved to the delete list. The new value 4 and new value 3 are both discarded.

Figure 17G:
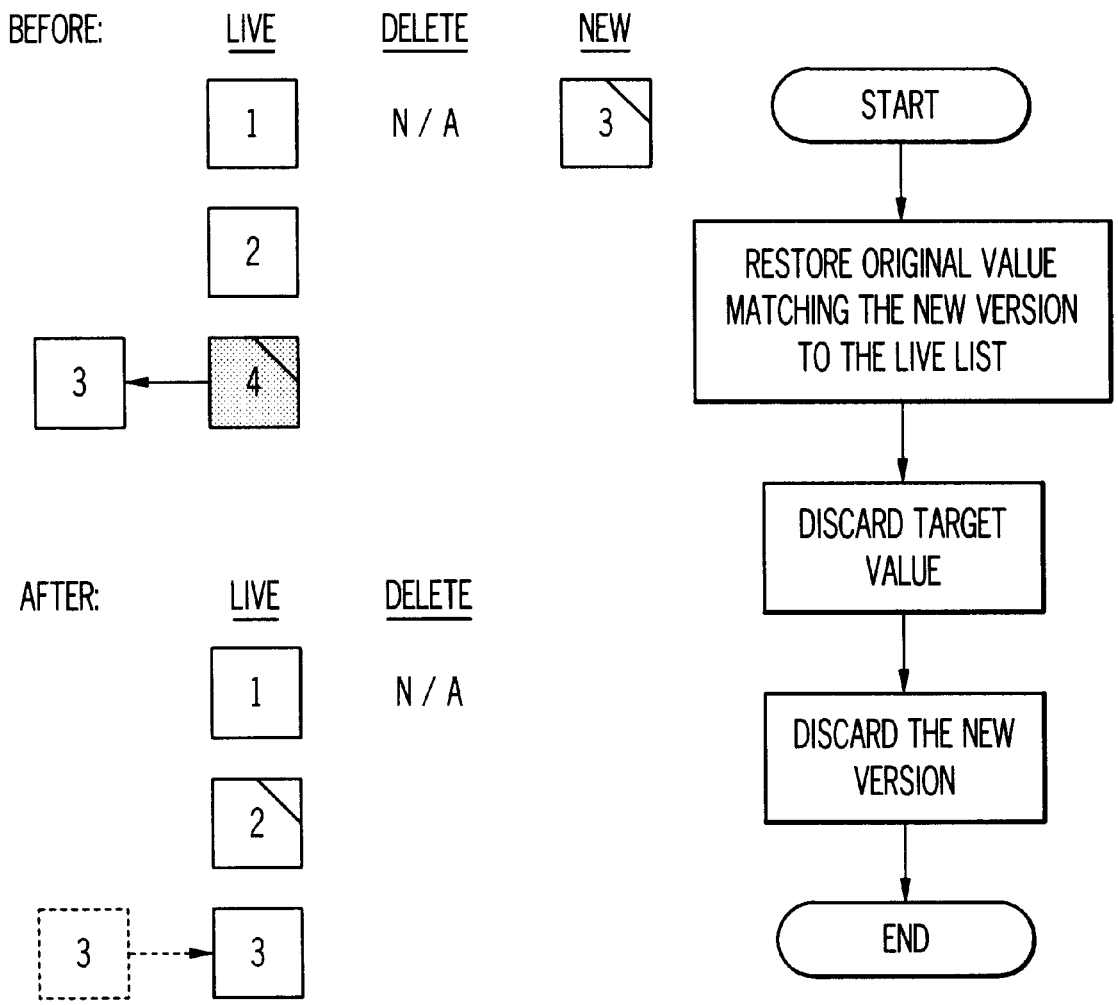

FIG. 17g demonstrates modification Case 8. As shown in the Before view, the target object is new value 4, which has replaced and has a link to original value 3. The target value is being replaced with new value 3, which is identical to original value 3. As shown in the After view, this scenario is handled by restoring the original value 3 to the live list and discarding the new values 3 and 4.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For instance, the invention has been illustrated in the context of networked computers, however, the invention can be used with any interconnect nodes. Likewise, the invention has utility in systems other than NDS and NetWare, including, for example, Windows NT, Windows 95, OS/2, Macintosh, Vines, Unix, etc. In addition, the invention is applicable to management systems other than NDS, such as SAM or STREET TALK by BANYAN. Beyond these management services, the invention can be used with other programs that maintain their own data/resource repositories, such as MICROSOFT EXCHANGE or LOTUS NOTES. Accordingly, this invention is intended to embrace all such alternatives, modifications, and variations that fall within the spirit and broad scope of the amended claims.

What is claimed is:

1. A computer system, comprising:
   a) a management service for a computer network having a plurality of objects of different types, each of said objects having at least one associated attribute with an attribute syntax, a plurality of said attributes having an associated value being of a data type corresponding to the attribute syntax of the associated attribute;
   b) a data structure adapted to represent one or more attributes and associated values of a target object, said data structure being capable of being modified;
   c) a user interface for displaying at least a portion of the data structure as an attribute tree structure irrespective of the target object type, said user interface being adapted to receive inputs from a human user;
   d) one or more generic syntax editors adapted to receive inputs from a human user to modify the data structure, each of said one or more generic syntax editors corresponding to at least one attribute syntax; and
   e) a mechanism to modify the target object to include modifications made to the data structure.

2. A computer system as recited in claim 1, wherein upon the selection of an attribute or its value, a generic syntax editor is displayed corresponding to the attribute syntax of the selected attribute.

3. A computer system as recited in claim 1, wherein associated values are displayed in relation to the corresponding attributes.

4. A computer system as recited in claim 1, wherein the management service is a distributed directory.

5. A computer system recited in claim 1, wherein the tree structure is displayed subordinate to a target object.

6. A method in a computer system, comprising the steps of:
   a) accessing a management service for managing computer networks, the management service having a plurality of objects each created from a class, each of said objects having at least one associated attribute with an attribute syntax, a plurality of said attributes having an associated value;
   b) selecting a target object in the management service;
   c) generically displaying as a tree structure, independent of the attributes in the class from which the target object was created, at least a portion of the attributes for the target object;
   d) selecting a target attribute from the tree structure;
   e) providing a generic editor corresponding to the syntax of the target attribute of the target object, said generic editor being adapted to receive inputs from a human user;
   f) receiving inputs by the generic editor for modifying the values associated with the target attribute; and
   g) modifying the management service to include one or more of the modifications to the values received by the generic editor.

7. A method as recited in claim 6, wherein the step of generically displaying additionally comprises the step of displaying in the tree structure values corresponding to one or more of the displayed attributes.

8. A computer readable medium comprising instructions for performing the method recited in claim 6.

9. A method as recited in claim 6, wherein the objects are displayed in a hierarchical relationship.

10. A method as recited in claim 9 wherein the tree structure of the attributes are displayed subordinate to the target object.

* * * * *